US011934713B2

(12) United States Patent
Kitai

(10) Patent No.: US 11,934,713 B2
(45) Date of Patent: Mar. 19, 2024

(54) IMAGE FORMING SYSTEM, INSPECTION DEVICE, AND INSPECTION METHOD

(71) Applicant: Tadashi Kitai, Kanagawa (JP)

(72) Inventor: Tadashi Kitai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/307,344

(22) Filed: Apr. 26, 2023

(65) Prior Publication Data

US 2023/0350615 A1  Nov. 2, 2023

(30) Foreign Application Priority Data

May 2, 2022 (JP) .................................. 2022-076061
Mar. 24, 2023 (JP) .................................. 2023-048002

(51) Int. Cl.
*G06F 3/12* (2006.01)
*G06T 7/00* (2017.01)

(52) U.S. Cl.
CPC ............ *G06F 3/121* (2013.01); *G06F 3/1208* (2013.01); *G06F 3/1253* (2013.01); *G06T 7/001* (2013.01); *G06T 2200/24* (2013.01); *G06T 2207/30144* (2013.01)

(58) Field of Classification Search
None
See application file for complete search history.

(56) References Cited

U.S. PATENT DOCUMENTS

| | | | |
|---|---|---|---|
| 2009/0080034 A1 | 3/2009 | Yamagishi et al. | |
| 2011/0116110 A1 | 5/2011 | Roof et al. | |
| 2012/0162649 A1 | 6/2012 | Ishizaki et al. | |
| 2013/0044342 A1 | 2/2013 | Kaneko et al. | |
| 2013/0136314 A1 | 5/2013 | Yamakawa | |
| 2013/0301067 A1* | 11/2013 | Nakamura | H04N 1/00082 358/1.13 |
| 2014/0314281 A1* | 10/2014 | Kojima | H04N 1/00045 382/112 |
| 2019/0394357 A1* | 12/2019 | Sugahara | H04N 1/6027 |
| 2020/0009860 A1* | 1/2020 | Kamada | G06T 7/11 |
| 2020/0186663 A1* | 6/2020 | Kobayashi | G06F 3/1254 |

(Continued)

FOREIGN PATENT DOCUMENTS

| | | |
|---|---|---|
| EP | 2810782 | 12/2014 |
| JP | 2013-099931 | 5/2013 |

(Continued)

OTHER PUBLICATIONS

Extended European Search Report for 23170278.8 dated Aug. 18, 2023.

*Primary Examiner* — Henok Shiferaw
(74) *Attorney, Agent, or Firm* — IPUSA, PLLC

(57) ABSTRACT

An image forming system includes circuitry. The circuitry reads an inspection target image from a printed matter. The circuitry generates a difference image between the inspection target image and a comparison target image. The circuitry performs processing on the difference image using a threshold value to perform determination as to whether a defect of the printed matter is present. The circuitry calculates a threshold value for show-through at which a show-through of the printed matter is not determined as the defect of the printed matter among multiple threshold values based on a result of the determination.

7 Claims, 20 Drawing Sheets

(56) References Cited

U.S. PATENT DOCUMENTS

| | | | |
|---|---|---|---|
| 2020/0228678 A1* | 7/2020 | Ikari | H04N 1/4053 |
| 2021/0195059 A1* | 6/2021 | Ikari | H04N 1/00795 |
| 2023/0074128 A1* | 3/2023 | Fujita | G06T 7/0002 |
| 2023/0386020 A1* | 11/2023 | Haruta | G06T 7/337 |

FOREIGN PATENT DOCUMENTS

| | | | | |
|---|---|---|---|---|
| JP | 2013099931 A | * | 5/2013 | B41J 3/44 |
| JP | 2015-178190 | | 10/2015 | |

* cited by examiner

FIG. 8

| ITEM | REMARKS | INITIAL VALUE |
|---|---|---|
| JOB GENERATION SOURCE | DFE JOB, INTERNAL JOB | INITIALIZED BY GENERATION SOURCE |
| GENERATION TIME | TIME AT WHICH GENERATION SOURCE GENERATED JOB INFORMATION | INITIALIZED BY GENERATION SOURCE |
| PAGE ID | IDENTIFICATION INFORMATION OF PRINT PAGE, INCREMENTED BY ONE FOR OUTPUT OF EACH PAGE FROM WHEN POWER SOURCE IS TURNED ON | 0 |
| PRINT SIDE | ONE SIDE, FRONT IN DUPLEX, BACK IN DUPLEX | 0 |
| SHEET ID | IDENTIFICATION INFORMATION OF PRINT SHEET, INCREMENTED BY ONE FOR OUTPUT OF EACH SHEET FROM WHEN POWER SOURCE IS TURNED ON | 0 |
| COPY ID | IDENTIFICATION INFORMATION OF COPY UNIT, INCREMENTED BY ONE FOR OUTPUT OF EACH COPY FROM WHEN POWER SOURCE IS TURNED ON | 0 |
| JOB ID | IDENTIFICATION INFORMATION OF JOB, INCREMENTED BY ONE FOR OUTPUT OF EACH JOB FROM WHEN POWER SOURCE IS TURNED ON | 0 |
| SHEET TYPE | TYPE OF SHEET | INITIALIZED BY GENERATION SOURCE |
| SHEET SIZE | SIZE OF SHEET | INITIALIZED BY GENERATION SOURCE |
| JOB TYPE | TARGET OF DEFECT DETECTION, NON-TARGET OF DEFECT DETECTION, SLIP SHEET FOR DEFECT DETECTION IDENTIFICATION, ADJUSTMENT OF THRESHOLD VALUE FOR SHOW-THROUGH | INITIALIZED BY GENERATION SOURCE |
| ... | ... | ... |

FIG. 12

| No. | UPPER LEFT COORDINATES | | LOWER RIGHT COORDINATES | |
|---|---|---|---|---|
| | X | Y | X | Y |
| 1 | 1800 | 200 | 1750 | 250 |
| 2 | 1600 | 200 | 1530 | 230 |
| 3 | 1400 | 200 | 1420 | 220 |
| ... | ... | ... | ... | ... |

FIG. 13

| No. | UPPER LEFT COORDINATES | | LOWER RIGHT COORDINATES | |
|---|---|---|---|---|
| | X | Y | X | Y |
| 1 | 200 | 2200 | 250 | 2150 |
| 2 | 400 | 2200 | 430 | 2130 |
| 3 | 600 | 2200 | 620 | 2120 |
| ... | ... | ... | ... | ... |

FRONT FACE OF READ IMAGE

BACK FACE OF READ IMAGE

FIG. 17

| FRONT FACE | BACK FACE | IMPACT ON DIFFERENCE |
|---|---|---|
| WHITE | WHITE | NONE |
| WHITE | BLACK | NONE |
| BLACK | WHITE | BLACK SIDE |
| BLACK | BLACK | NONE |

FIG. 18

| Level | DOT DEFECT | LINEAR DEFECT (VERTICAL) | LINEAR DEFECTS (HORIZONTAL) |
|---|---|---|---|
| 1 | 80 | 60 | 96 |
| 2 | 50 | 40 | 66 |
| 3 | 30 | 24 | 45 |
| 4 | 20 | 16 | 30 |
| 5 | 10 | 8 | 12 |

FIG. 19

DOT DEFECT DETERMINATION FILTER (3×3)

|  | X(−1) | X(0) | X(+1) |
|---|---|---|---|
| Y(−1) | −0.125 | −0.125 | −0.125 |
| Y(0) | −0.125 | 1 | −0.125 |
| Y(+1) | −0.125 | −0.125 | −0.125 |

FIG. 20

LINEAR DEFECT (VERTICAL) DETERMINATION FILTER (3 × 5)

|       | X(-1) | X(0) | X(+1) |
|-------|-------|------|-------|
| Y(-1) | -0.1  | 0.2  | -0.1  |
| Y(-1) | -0.1  | 0.2  | -0.1  |
| Y(0)  | -0.1  | 0.2  | -0.1  |
| Y(+1) | -0.1  | 0.2  | -0.1  |
| Y(-1) | -0.1  | 0.2  | -0.1  |

FIG. 21

LINE DEFECT (HORIZONTAL) DETERMINATION FILTER (5 × 3)

|       | X(-2) | X(-1) | X(0) | X(+1) | X(+2) |
|-------|-------|-------|------|-------|-------|
| Y(-1) | -0.1  | -0.1  | -0.1 | -0.1  | -0.1  |
| Y(0)  | 0.2   | 0.2   | 0.2  | 0.2   | 0.2   |
| Y(+1) | -0.1  | -0.1  | -0.1 | -0.1  | -0.1  |

IMAGE FORMING SYSTEM, INSPECTION DEVICE, AND INSPECTION METHOD

CROSS-REFERENCE TO RELATED APPLICATIONS

This patent application is based on and claims priority pursuant to 35 U.S.C. § 119(a) to Japanese Patent Application Nos. 2022-076061, filed on May 2, 2022, and 2023-048002, filed on Mar. 24, 2023, in the Japan Patent Office, the entire disclosure of which is hereby incorporated by reference herein.

BACKGROUND

Technical Field

Embodiments of the present disclosure relate to an image forming system, an inspection device, and an inspection method.

Related Art

An inspection device is known that reads a print output by a printer with a camera or a line sensor of a scanner, to inspect whether printing is correctly performed based on a result of the reading of the print output.

SUMMARY

An embodiment of the present disclosure includes an image forming system. The image forming system includes circuitry. The circuitry reads an inspection target image from a printed matter. The circuitry generates a difference image between the inspection target image and a comparison target image. The circuitry performs processing on the difference image using a threshold value to perform determination as to whether a defect of the printed matter is present. The circuitry calculates a threshold value for show-through at which a show-through of the printed matter is not determined as the defect of the printed matter among multiple threshold values based on a result of the determination.

An embodiment of the present disclosure includes an inspection device. The inspection device includes circuitry. The circuitry reads an inspection target image from a printed matter. The circuitry generates a difference image between the inspection target image and a comparison target image. The circuitry performs processing on the difference image using a threshold value to perform determination as to whether a defect of the printed matter is present. The circuitry calculates a threshold value for show-through at which show-through of the printed matter is not determined as the defect of the printed matter among multiple threshold values based on a result of the determination.

An embodiment of the present disclosure includes an inspection method performed by an inspection device that inspects a printed matter. The inspection method includes reading an inspection target image from the printed matter. The inspection method includes generating a difference image between the inspection target image and a comparison target image. The inspection method includes performing processing on the difference image using a threshold value to perform determination as to whether a defect of the printed matter is present. The inspection method includes calculating a threshold value for show-through at which show-through of the printed matter is not determined as the defect of the printed matter among multiple threshold values based on a result of the determination.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 8 is a table for describing items of job information, according to an embodiment of the present disclosure;

FIG. 12 is a table illustrating an example of lateral inversion coordinate information of the front face of the original image, according to an embodiment of the present disclosure;

FIG. 13 is a table illustrating an example of vertical inversion coordinate information of the front face of the original image, according to an embodiment of the present disclosure;

FIG. 17 is a table of an example of how the difference image appears, according to an embodiment of the present disclosure;

FIG. 18 is a table of an example of a threshold value set, according to an embodiment of the present disclosure;

FIG. 19 is a diagram illustrating of an example of a dot defect determination filter, according to an embodiment of the present disclosure;

FIG. 20 is a diagram illustrating an example of a vertical linear defect determination filter, according to an embodiment of the present disclosure;

FIG. 21 is a diagram illustrating an example of a horizontal linear defect determination filter, according to an embodiment of the present disclosure;

Figure 1:
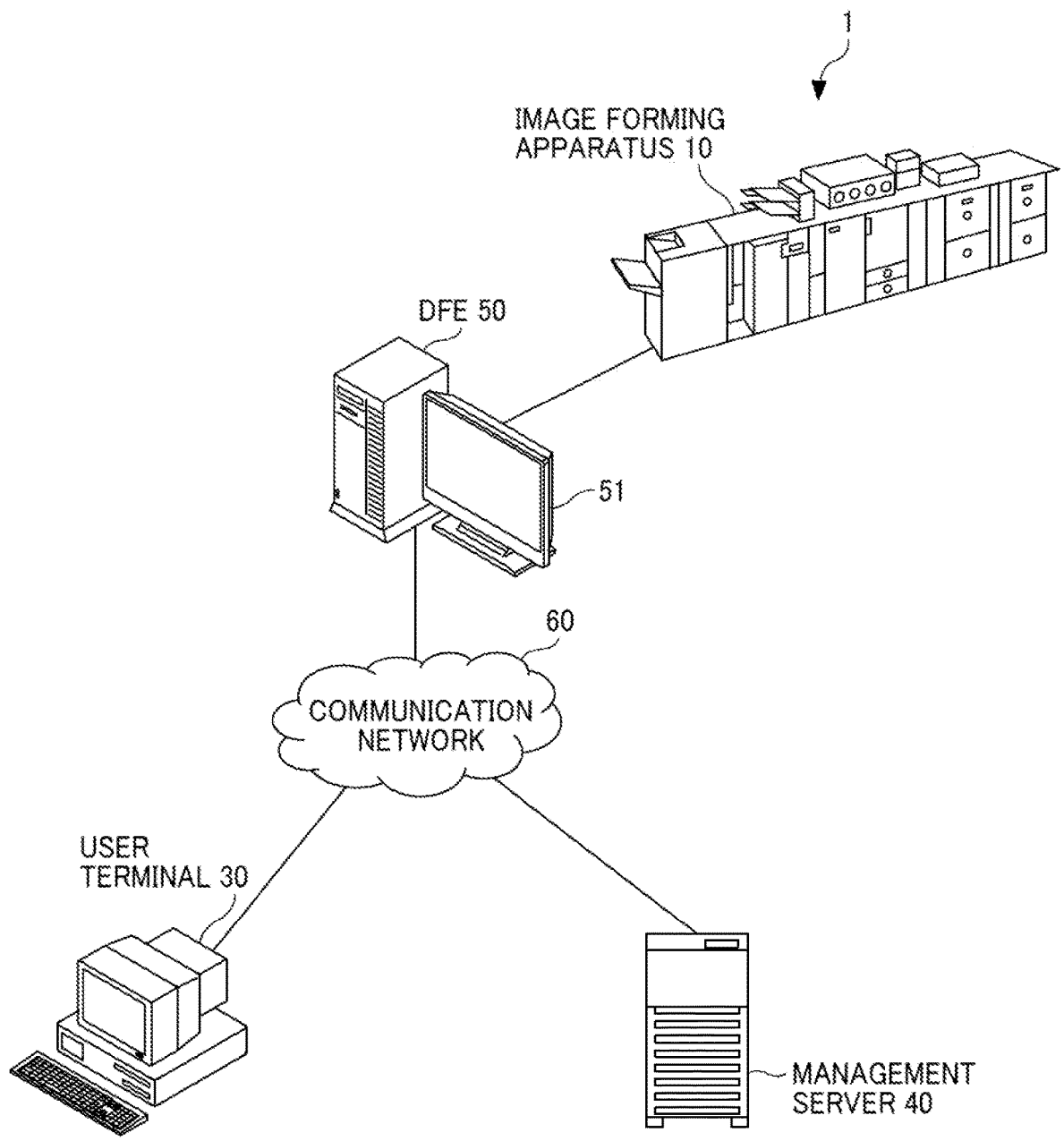
FIG. 1 is a diagram illustrating an example of an overall configuration of an image forming system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the drawings, embodiments of the present disclosure are described.

Embodiment 1

FIG. 1 is a diagram illustrating an example of an overall configuration of an image forming system 1.

The image forming system 1 of FIG. 1 includes an image forming apparatus 10, a user terminal 30, a management server 40, a digital front end (DFE) 50, and a display device 51. The user terminal 30, the management server 40, and the DFE 50 are communicably connected with each other through a communication network 60. Further, the image forming apparatus 10 and the DFE 50 are communicably connected with each other.

The image forming apparatus 10 is an apparatus that forms an image. Examples of the image forming apparatus 10 include a color production printer, a laser printer, and an inkjet printer. The image forming apparatus 10 receives image data from the DFE 50 and prints an image on a sheet according to the received image data. The sheet is an example of a conveyance medium on which an image is to be formed.

The user terminal 30 is a terminal that receives an operation from a user and instructs the DFE 50 to print an image. Specifically, the user terminal 30 transmits printing job data including image data to the DFE 50 or the management server 40.

In response to receiving printing job data from the user terminal 30, the management server 40 adds the received printing job data as a queue to a memory that stores printing job data waiting to be printed. The management server 40 extracts printing job data from the queue in the order in which the printing job data is added to the queue or in accordance with a priority set appropriately. The management server 40 transmits the extracted printing job data to the DFE 50.

The DFE 50 is a digital front end, which is an apparatus that controls the image forming apparatus 10. In response to receiving printing job data with a signal that instructs to print an image from the user terminal 30 or the management server 40, the DFE 50 converts the received printing job data into image data in a format that is processable by the image forming apparatus 10, using a built-in raster image processor (RIP) engine. Further, the DFE 50 transmits the image data obtained by the conversion to the image forming apparatus 10.

The configuration of the information forming system 1 illustrated in FIG. 1 is just one example. In another example, the image forming system 1 may include other apparatuses or devices. In another example, the image forming system 1 may include a plurality of image forming apparatuses 10, a plurality of user terminals 30, a plurality of management servers 40, and a plurality of DFEs 50.

Figure 2:
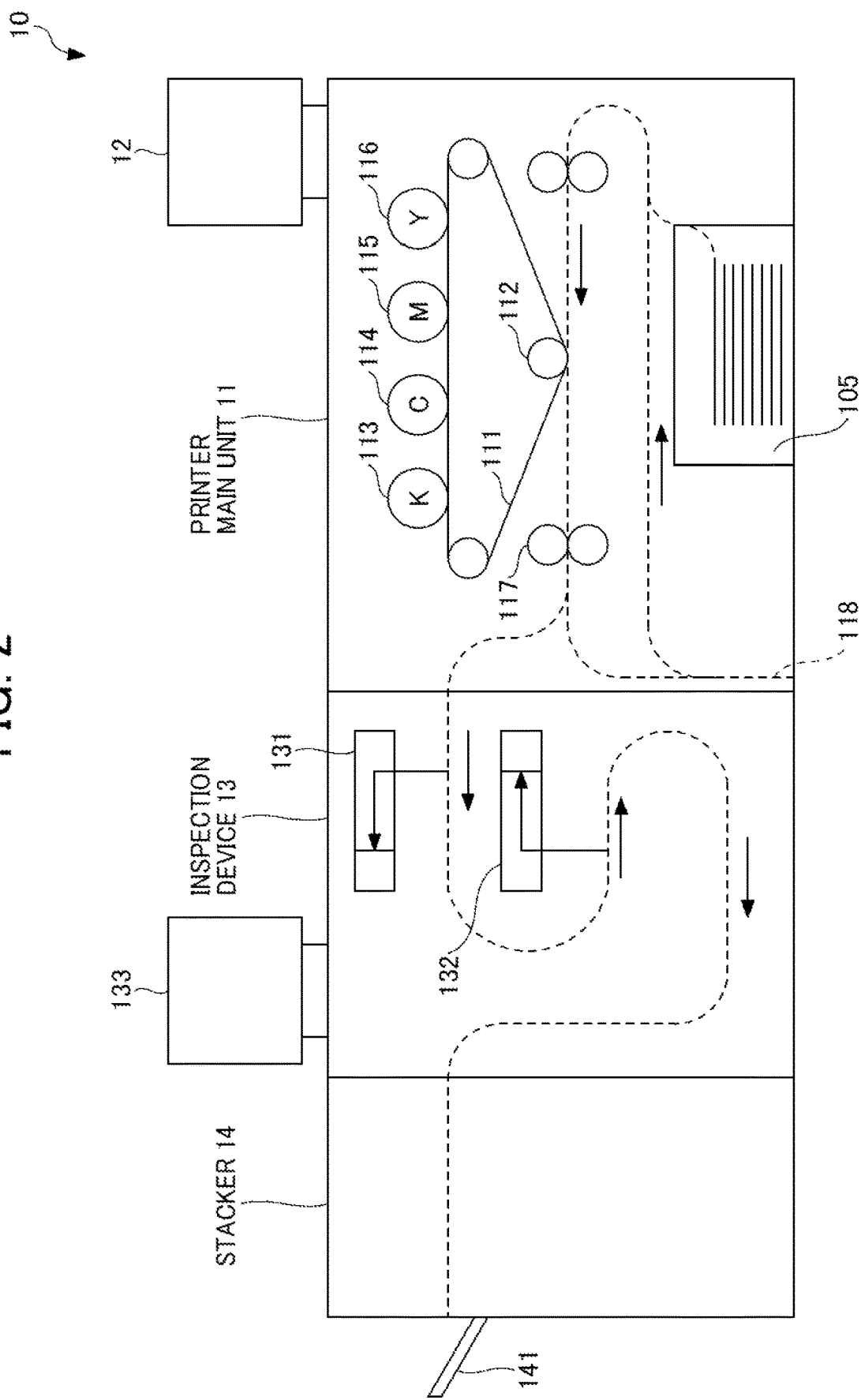
FIG. 2 is a diagram illustrating an example of a hardware configuration of an image forming apparatus, according to an embodiment of the present disclosure.

FIG. 2 is a diagram illustrating an example of a hardware configuration of the image forming apparatus 10. The image forming apparatus 10 of FIG. 2 includes a printer main unit 11, an inspection device 13, and a stacker 14.

The printer main unit 11 receives printing job data including image data such as printing image data (RIP image data) from an external apparatus such as the DFE 50. The printer main unit 11 performs printing in response to an execution instruction based on the received printing job data or an execution instruction based on the printing job data stored in the printer main unit 11 according to a user's operation on a control panel 12.

The printer main unit 11 has a configuration in which photoconductor drums 116, 115, 114, and 113 are disposed along an intermediate transfer belt 111. The photoconductor drums 116, 115, 114, and 113 form yellow (Y), magenta (M), cyan (C), and black (K) toner images, respectively. The intermediate transfer belt 111 is an endless moving unit. Images of the respective colors are developed with toner on the respective surfaces of the photoconductor drums 116, 115, 114, and 113 and are transferred and superimposed one after another onto the surface of the intermediate transfer belt 111, and thereby a full-color image is formed.

The formed full-color image is transferred onto a sheet by a transfer roller 112 conveyed by a conveyance roller. The sheet conveyed by the conveyance roller is fed from a sheet feeding tray 105. On the sheet onto which the full-color image is transferred, the toner is further fixed by the fixing roller 117.

The sheet on which the toner is fixed by the fixing roller 117 is ejected to the inspection device 13 in a case of single-sided printing. In a case of duplex printing, the sheet on which the toner is fixed by the fixing roller 117 is conveyed to a reverse path 118 in a conveyance passage, and after the sheet is reversed, the sheet is conveyed again to the position of the transfer roller 112. Subsequently, the sheet on which the full-color image transferred and fixed on the back face is ejected to the inspection device 13.

The inspection device 13 is a device that inspects printed sheets (printed matter) by the printer main unit 11. The inspection device 13 includes a first in-line sensor 131, a second in-line sensor 132, and a control panel 133. The inspection device 13 may not include the control panel 133. The inspection device 13 that does not include the control panel 133 may be configured to receive an operation through the control panel 12 of the printer main unit 11 or a communicably connected computer.

The first in-line sensor 131 and the second in-line sensor 132 read a printed image (an inspection target image) from both sides of the printed matter printed by the printer main unit 11. Although the description given above referring to FIG. 2 is of an example in which the inspection device 13 includes the first in-line sensor 131 and the second in-line sensor 132, in another example, the inspection device 13 may include one or three or more in-line sensors provided that the inspection device 13 can read both sides of the printed matter.

Each of the first in-line sensor 131 and the second in-line sensor 132 includes a light source and a line image sensor. The line image sensor includes multiple imaging elements aligned one dimensionally in the width direction of a sheet. The multiple imaging elements irradiate the sheet passing over a reading position with light from a light source, photoelectrically converts reflected light on the sheet for each pixel, and reads the reflected light.

The first in-line sensor 131 and the second in-line sensor 132 read an image (print image) printed on the front face and the back face of the sheet as the inspection target image by repeatedly performing an operation of reading the image one line by one line in the width direction of the sheet, in accordance with the sheet passing operation over the reading position. Further, the first in-line sensor 131 and the second in-line sensor 132 can obtain a read image of three colors of red, green, and blue (referred to hereinafter as "RGB").

The stacker 14 includes a sheet ejection tray 141 and stacks printed sheets (printed matter) ejected from the printer main unit 11 via the inspection device 13 on the sheet ejection tray 141. The stacker 14 and the sheet ejection tray 141 are configured to receive and stack the printed sheets. The stacker 14 may include a plurality of sheet ejection trays 141.

The present embodiment is given providing that, for example, that the RIP image is in the CMYK format (format in a subtractive color mode including cyan, magenta, yellow, and black) with 8-bit colors and 600 dpi resolution, and the read image is in the RGB format with 8-bit colors and 200 dpi resolution. However, embodiments of the present disclosure are not limited to the above-described data formats in image formation.

Figure 3:
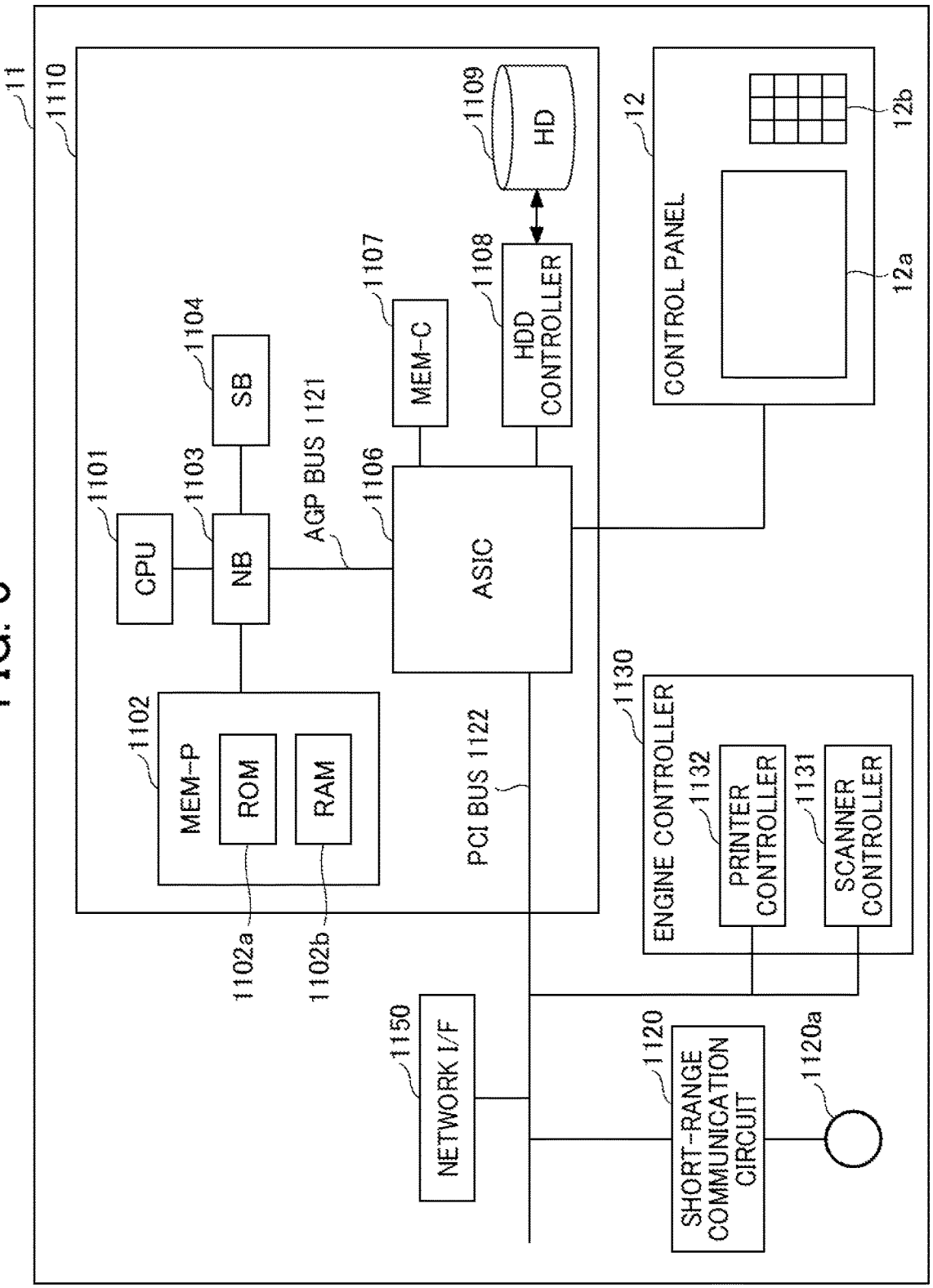
FIG. 3 is a diagram illustrating an example of a hardware configuration of a printer main unit, according to an embodiment of the present disclosure.

FIG. 3 is a block diagram illustrating an example of a hardware configuration of the printer main unit 11.

The printer main unit 11 includes a controller 1110, a short-range communication circuit 1120, an engine controller 1130, the control panel 12, and a network interface (I/F) 1150.

The controller 1110 includes a central processing unit (CPU) 1101 as a main component of a computer, a system memory (MEM-P) 1102, a north bridge (NB) 1103, a south bridge (SB) 1104, an application specific integrated circuit (ASIC) 1106, a local memory (MEM-C) 1107 as a storage device, a hard disk drive (HDD) controller 1108, and a hard disk (HD) 1109 as a storage device.

The NB 1103 and the ASIC 1106 are connected with each other through an accelerated graphics port (AGP) bus 1121. The CPU 1101 is a control device that performs overall control of the printer main unit 11. The NB 1103 is a bridge to connect the CPU 1101 with the MEM-P 1102, the SB 1104, and the AGP bus 1121. The NB 1103 includes a memory controller that controls reading and writing data from and to the MEM-P 1102, a peripheral component interconnect (PCI) master, and an AGP target.

The MEM-P 1102 includes a read only memory (ROM) 1102a and a random access memory (RAM) 1102b. The ROM 1102a is a memory that stores programs and data for implementing various functions of the controller 1110. The RAM 1102b is used as a memory that deploys programs or data, or as a drawing memory that stores drawing data for printing. In one example, the programs stored in the RAM 1102b are stored in any computer-readable storage (recording) medium, such as a compact disc-read only memory (CD-ROM), compact disc-recordable (CD-R), or digital versatile disk (DVD), in a file format installable or executable by the computer, for distribution.

The SB 1104 is a bridge that connects the NB 1103 to a PCI device or a peripheral device. The ASIC 1106 is an integrated circuit (IC) for use in image processing having hardware elements for image processing. The ASIC 1106 serves as a bridge connecting the AGP bus 1121, a PCI bus 1122, the HDD controller 1108, and the MEM-C 1107 to each other.

The ASIC 1106 includes a PCI target, an AGP master, an arbiter (ARB) as a central processor of the ASIC 1106, a memory controller to control the MEM-C 1107, a plurality of direct memory access controllers (DMACs), and a PCI unit. The DMACs rotates image data with a hardware logic, for example. The PCI unit transfers data between a scanner controller 1131 and a printer controller 1132 through the PCI bus 1122. A universal serial bus (USB) interface or an Institute of Electrical and Electronics Engineers 1394 (IEEE 1394) interface may be connected to the ASIC 1106.

The MEM-C 1107 is a local memory used as a copy image buffer and a code buffer. The HD 1109 is a storage device that stores, for example, image data, font data used in printing, and forms. The HD 1109 controls reading or writing of data from or to the HD 1109 under control of the CPU 1101.

The AGP bus 1121 is a bus interface for a graphics accelerator card that is devised for accelerating graphic processing. The AGP bus 1121 directly accesses the MEM-P 1102 with high throughput to accelerate the graphics accelerator card.

The short-range communication circuit 1120 includes a short-range communication antenna 1120a. The short-range communication circuit 1120 is a communication circuit that communicates in compliance with the near field radio communication (NFC) or the Bluetooth®, for example. The engine controller 1130 includes the scanner controller 1131 and the printer controller 1132. The control panel 12 includes a panel display 12a and operation keys 12b. The panel display 12a is, e.g., a touch panel that displays current settings or a selection screen and that receives inputs from an operator. The operation keys 12b include, e.g., a numeric keypad and a start key. The numeric keypad receives assigned values of image forming parameters such as an image density parameter. The start key receives an instruction to start copying.

The controller 1110 controls overall operation of the printer main unit 11 and controls, for example, drawing, communication, and input from the control panel 12. The scanner controller 1131 reads the image formed on the conveyance medium such as a sheet, to generate image data. The printer controller 1132 transfers the image using a color material such as a toner image onto the conveyance medium such as the sheet, and fixes the transferred image on the conveyance medium such as the sheet, to perform image formation on the conveyance medium such as the sheet. Further, the scanner controller 1131 or the printer controller 1132 performs image processing such as error diffusion and gamma conversion.

The network I/F 1150 is an interface for performing data communication using a communication network. The short-range communication circuit 1120 and the network I/F 1150 are electrically connected to the ASIC 1106 via the PCI bus 1122.

Figure 4:
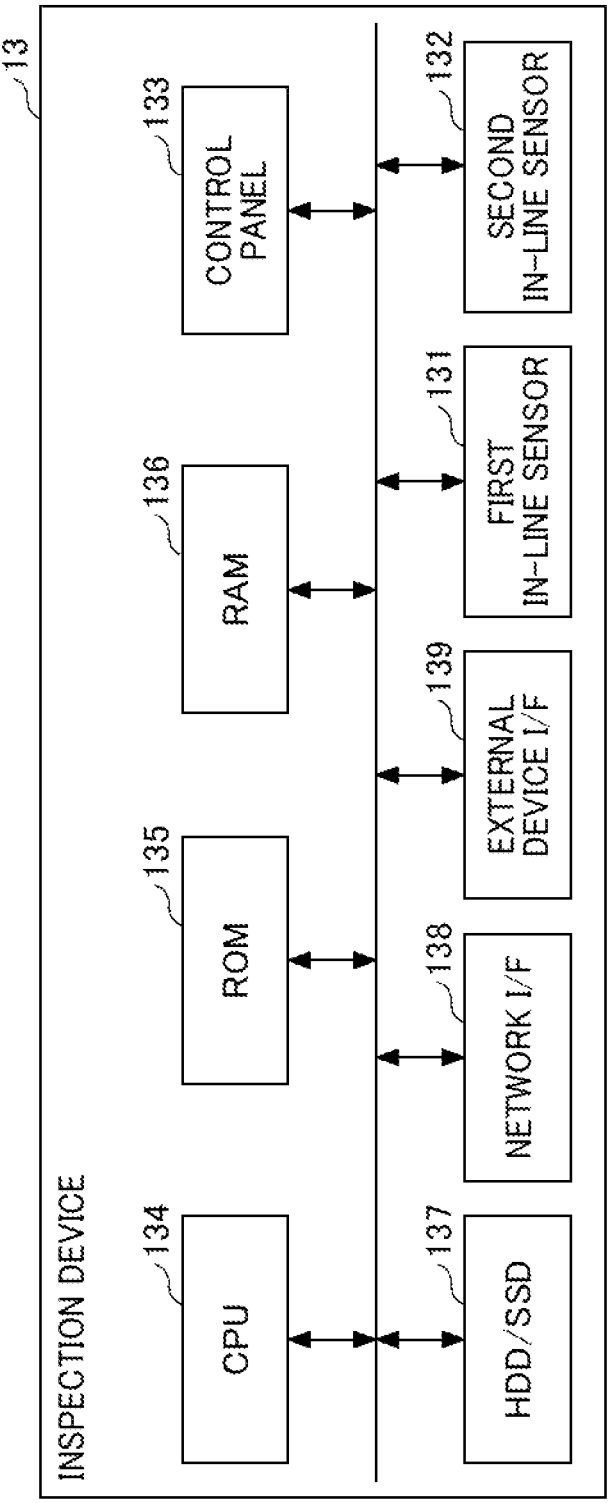
FIG. 4 is a diagram illustrating an example of a hardware configuration of an inspection device, according to an embodiment of the present disclosure.

FIG. 4 is a block diagram illustrating an example of a hardware configuration of the inspection device 13.

The inspection device 13 includes the first in-line sensor 131, the second in-line sensor 132, the control panel 133, a CPU 134, a ROM 135, a RAM 136, an HDD/solid state drive (SSD) 137, a network I/F 138, and an external device I/F 139. For example, the CPU 134, the ROM 135, the RAM 136, the HDD/SSD 137, the network I/F 138, and the external device I/F 139 are configured by a computer.

The CPU 134 loads programs stored in the ROM 135 or the HDD/SSD 137 onto the RAM 136. The CPU 134 executes various processing described below according to the programs loaded onto the RAM 136.

The ROM 135 is a nonvolatile auxiliary storage device. The ROM 135 stores programs such as a basic input/output system (BIOS) that define programed basic operations of the inspection device 13. The RAM 136 is a volatile main storage device. The RAM 136 is used as a work area for the CPU 134.

The HDD/SSD 137 is a nonvolatile auxiliary storage device having a large capacity. The HDD/SSD 137 stores image data that is read from a printed matter, programs for executing various processes described below, and settings information.

The network I/F 138 is, for example, a local area network (LAN) card, and is a relay unit for communicating with other devices through the communication network. The external device I/F 139 is a relay unit for communicating with the devices connected as external devices, such as the DFE 50, the printer main unit 11, and the stacker 14.

The DFE 50 is configured by a computer, and has the substantially same hardware configuration as the hardware configuration of the inspection device 13 of FIG. 4, except for the first in-line sensor 131, the second in-line sensor 132, and the control panel 133.

Figure 5:
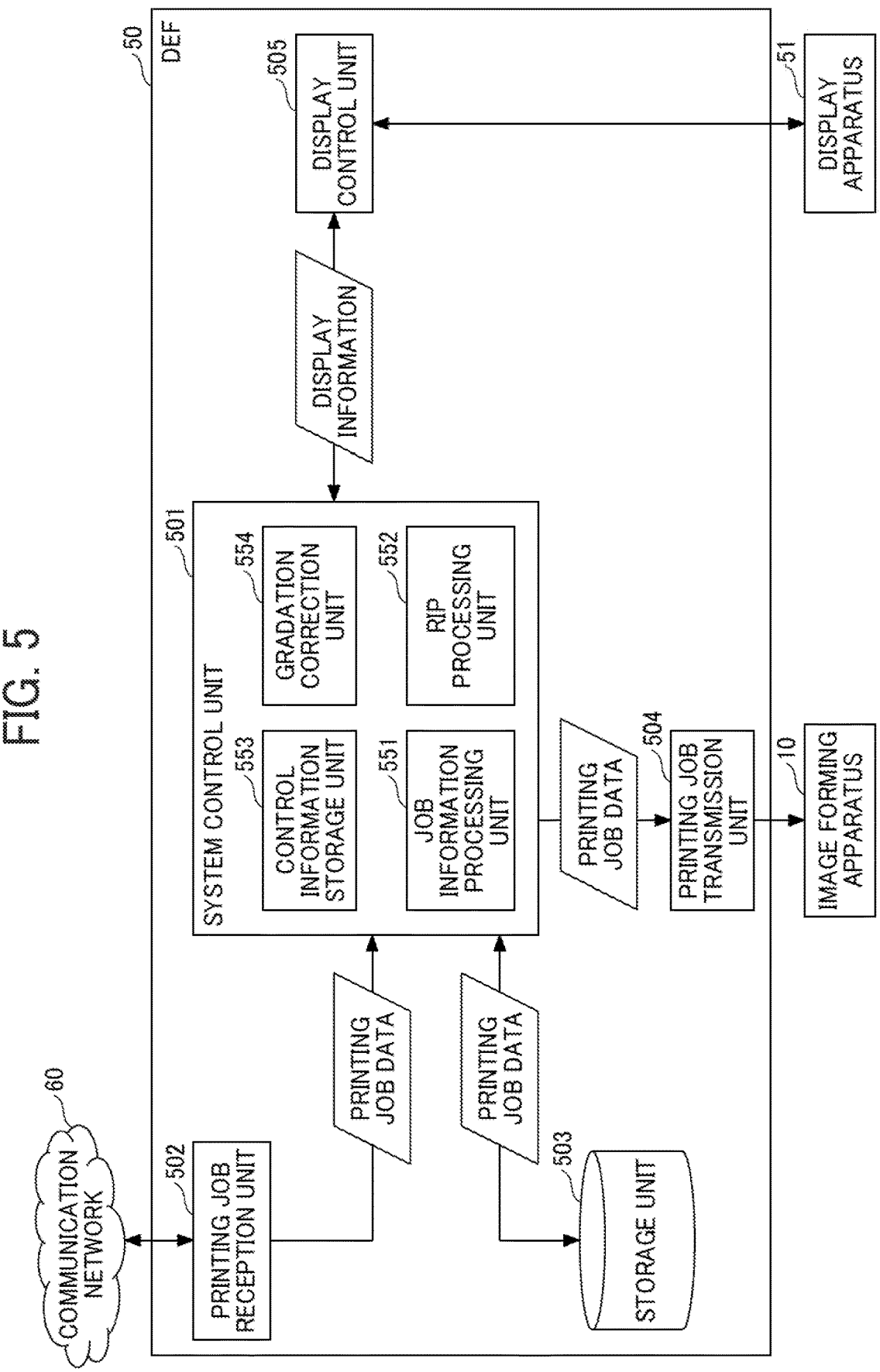
FIG. 5 is a diagram illustrating an example of functions of a digital front end (DFE), according to an embodiment of the present disclosure.

FIG. 5 is a block diagram illustrating an example of functions of the DFE 50.

The DFE 50 includes a system control unit 501, a printing job reception unit 502, a storage unit 503, a printing job transmission unit 504, and a display control unit 505. Each of the units is implemented by a CPU of the DFE 50 executing processing according to a program stored in, for example, a ROM.

The system control unit 501 includes a job information processing unit 551, a RIP processing unit 552, a control information storage unit 553, and a gradation correction unit 554.

The job information processing unit 551 processes the printing job data. The RIP processing unit 552 performs predetermined color conversion processing on the CMYK values or the RGB values of the input image data using an RIP engine and converts the CMYK values or the RGB values into image data such as an RIP image in a CMYK format suitable for the image forming apparatus 10. The control information storage unit 553 stores control information controlled by the system control unit 501. The gradation correction unit 554 corrects a gradation of the image data converted by the RIP processing unit 552.

The printing job reception unit 502 receives the printing job data from the user terminal 30 or the management server 40 through the communication network 60. The storage unit 503 stores the printing job data received by the printing job reception unit 502. The printing job transmission unit 504 transmits, to the image forming apparatus 10, the printing job data processed by the system control unit 501. The printing job data transmitted to the image forming apparatus 10 includes job information described below and image data such as an RIP image. The display control unit 505 performs control to display display information generated by the system control unit 501 on the display device 51, for example.

Figure 6:
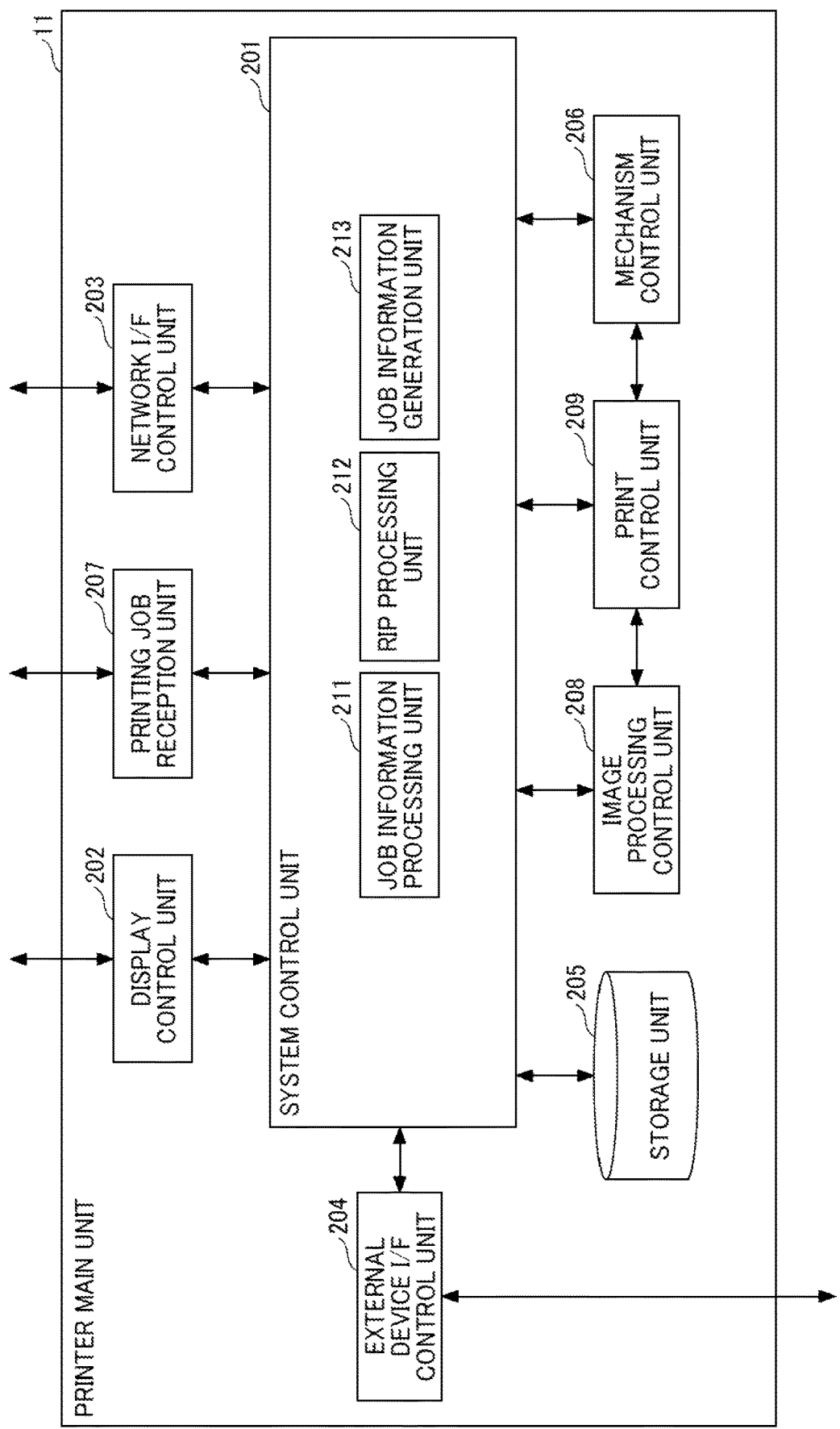
FIG. 6 is a diagram illustrating an example of functions of the printer main unit, according to an embodiment of the present disclosure.

FIG. 6 is a block diagram illustrating an example of functions of the printer main unit 11.

The printer main unit 11 includes a system control unit 201, a display control unit 202, a network I/F control unit 203, an external device I/F control unit 204, a storage unit 205, a mechanism control unit 206, a printing job reception unit 207, an image processing control unit 208, and a print control unit 209. Each of the units is implemented by the CPU 1101 or the ASIC 1106 executing processing according to a program stored in, for example, the MEM-P 1102 or the MEM-C 1107.

The system control unit 201 controls overall operation of the printer main unit 11. The system control unit 201 includes a job information processing unit 211, an RIP processing unit 212, and a job information generation unit 213.

The printing job reception unit 207 receives the printing job data from the DFE 50. The job information processing unit 211 processes job information included in the printing job data. The RIP processing unit 212 processes image data such as an RIP image included in the printing job data. The job information generation unit 213 generates printing job data including image data such as an RIP image for printing a test chart for adjusting a threshold value for show-through, in a case where "value indicating adjustment of a threshold value for show-through" is set in a parameter of a job type of job information described below. The test chart for adjusting a threshold value for show-through may be referred to hereinafter as a "show-through determination chart." Information and data relating to the show-through determination chart are stored in the storage unit 205, for example.

The display control unit 202 performs control to display various information on the control panel 12. The network I/F control unit 203 controls the network I/F 1150, to control connection with a communication network. When another device is connected to the printer main unit 11, the external device I/F control unit 204 controls connection with the connected device. The storage unit 205 stores various information including the printing job data.

The mechanism control unit 206 controls operations of mechanisms of the printer main unit 11, such as operations of a mechanism that performs sheet conveyance and operations of a mechanism that performs a transfer process in the printer main unit 11 including the printer controller 1132. The image processing control unit 208 processes a print image such as a show-through determination chart described below transferred by the mechanism control unit 206. The print control unit 209 controls formation of an image such as the show-through determination chart described below on the conveyance medium.

The mechanism control unit 206, the image processing control unit 208, and the print control unit 209 cooperate with each other to function as an image forming unit that forms an image such as the show-through determination chart described below on the conveyance medium.

Figure 7:
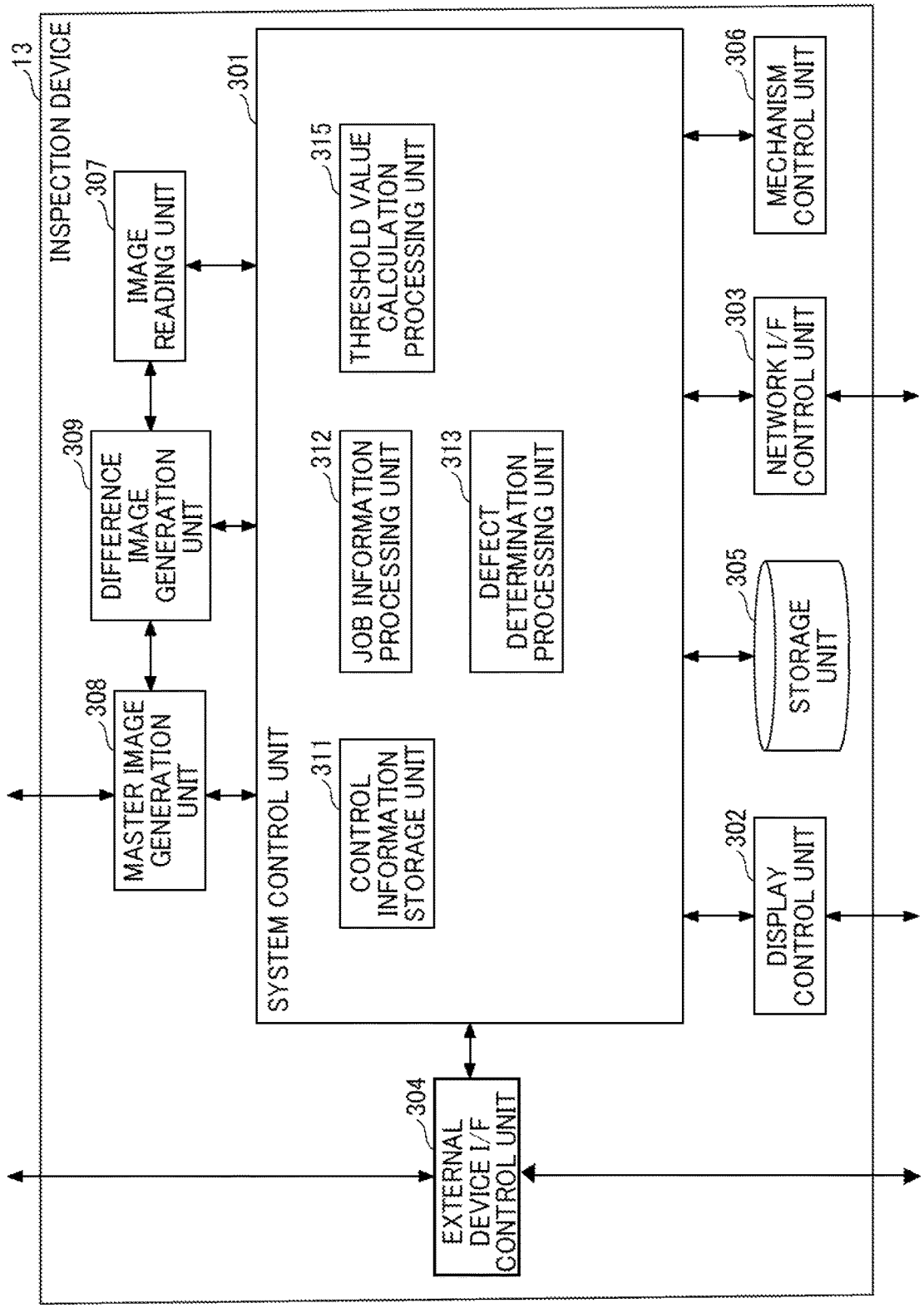
FIG. 7 is a diagram illustrating an example of functions of the inspection device, according to an embodiment of the present disclosure.

FIG. 7 is a block diagram illustrating an example of functions of the inspection device 13.

The inspection device 13 includes a system control unit 301, a display control unit 302, a network I/F control unit 303, an external device I/F control unit 304, a storage unit 305, a mechanism control unit 306, an image reading unit 307, a master image generation unit 308, and a difference image generation unit 309. Each of the units is implemented by the CPU 134 executing processing according to a program stored in, for example, the ROM 135 or the HDD/SSD 137.

The system control unit 301 controls overall operation of the inspection device 13. The system control unit 301 includes a control information storage unit 311, a job information processing unit 312, a defect determination processing unit 313, and a threshold value calculation processing unit 315.

The control information storage unit 311 stores control information controlled by the system control unit 301. Further, the control information storage unit 311 temporarily stores printing job data including job information to be controlled. The job information processing unit 312 extracts information to be processed by a post-processing device (e.g., a device that performs post-processing such as the stacker 14) from the job information and transmits the extracted information to the post-processing device via the external device I/F control unit 304.

The job information processing unit 312 extracts information to be processed by the mechanism control unit 306, the image reading unit 307, the master image generation unit 308, the difference image generation unit 309, the defect determination processing unit 313, and the threshold value calculation processing unit 315 from the printing job data including job information, and transfers the extracted information.

The display control unit 302 controls the control panel 133 or another device to display various information including a result of adjustment of the threshold value for show-through. Examples of the other device include terminal devices used by a user, such as a personal computer or a tablet terminal, the DFE 50, the printer main unit 11. The display control unit 302 performs a process of transmitting various information stored in the inspection device 13 in response to a request from software such as a web browser operating on the other device. Further, the display control unit 302 and software operating in the other device transmit various information of the inspection device 13 to the other device using a bidirectional communication protocol such as WebSocket and display the various information in real time. The display control unit 302 may be included in the inspection device 13 as a web server or may be included in a cloud server that receives various information including the result of adjustment of the threshold value for show-through from the inspection device 13.

The network I/F control unit 303 controls the network I/F 138. The external device I/F control unit 304 controls the external device I/F 139. The storage unit 305 stores various information. For example, the storage unit 305 stores information and data required for displaying a result check user interface (UI), which is described below, including a result of adjustment of the threshold value for show-through.

The mechanism control unit 306 controls an operation of a mechanism of the inspection device 13 such as conveyance of a sheet. The image reading unit 307 controls the first in-line sensor 131 and the second in-line sensor 132 to read print image data (referred to hereinafter as "inspection target image data") from both faces of a printed matter output by the printer main unit 11.

The master image generation unit 308 generates master image data of a print image on the basis of print data such as an RIP image included in printing job data. The master image data is an example of an image to be compared, e.g., a comparison target image. Specifically, the master image generation unit 308 converts the image data such as the RIP image in the CMYK format into master image data in the RGB format.

Thus, the master image data is data to be compared with inspection target image data that is read from printed matter by the image reading unit 307, and functions as correct answer data in a case where the printed matter is correctly printed.

The difference image generation unit 309 generates difference image data between the master image data and the inspection target image data. The defect determination processing unit 313 performs processing using a threshold value on the difference image data, to determine whether a defect is present in a printed matter (a print image printed on a sheet). The threshold value is information (value) as a determination criterion for determining whether a defect is present in a print image printed on a sheet.

When a pixel value exceeding the threshold value is present in the difference image data, the defect determination processing unit 313 determines that a defect is present in a printed matter. The defect determination processing unit 313 may use a threshold value set of a dot defect, a vertical linear defect, and a horizontal linear defect. For the threshold value, a setting change can be performed to raise a determination level (stricter criterion) or to lower the determination level (looser criterion).

The defect of the printed matter is a portion different from the master image, which is an image desired by a user, in the print image printed on the sheet. Examples of the defect of the printed matter includes a spot, a streak, a positional deviation of an image, a difference in color, and a void.

The threshold value calculation processing unit 315 calculates the threshold value for show-through through in a procedure described below when a "value indicating adjustment of a threshold value for show-through" is set in a parameter of a job type of job information described below. The calculation of a threshold value for show-through is a process of calculating, as a threshold value for show-through, a threshold value at which the defect determination processing unit 313 does not judge show-through in a printed matter as a defect of the printed matter from threshold values of a plurality of judgement levels.

FIG. 8 is a table for describing items of job information 901, according to embodiments of the present disclosure.

The job information 901 is reference information included in printing job data generated by the DFE 50 or the printer main unit 11. The job information 901 of FIG. 8 includes items "job generation source," "generation time," "page ID," "print side," "sheet ID," "copy ID," "jog ID," "sheet type," "sheet size, and "job type."

The value of the item "job generation source" is a value indicating the generation source of the printing job data and is either a DFE job or an internal job. For example, when job information is included in printing job data to be transmitted to the image forming apparatus 10 by the DFE 50, the value of the item "job generation source" is the DFE job. When the job information generation unit 213 of the printer main unit 11 generates printing job data, the value of the item "job generation source" is the internal job. The value of the item "generation time" is a value indicating the time at which the generation source generated the job information.

The value of the item "page ID" is a numerical value to identify a print image and is incremented by one for output of each page starting from activation of the power source. A numerical value is set in the item "page ID" when printing is executed. The value of the item "print side" is a value to identify whether the print image is to be printed on one side in single-sided printing, on the front face in duplex printing (front in duplex), or on the back face in duplex printing (back in duplex).

The value of the item "sheet ID" is a numerical value to identify a sheet. When duplex printing is performed, two page IDs are given to the same sheet ID. The value of the item "sheet ID" is incremented by one for processing of each page starting from activation of the power source. A numerical value is set in the item "sheet ID" when printing is executed. The value of the item "copy ID" is a numerical value to identify a unit of copy and is incremented by one for output of each copy starting from activation of the power source. A numerical value is set in the item "copy ID" when printing is executed.

The value of the item "job ID" is a numerical value to identify a printing job unit and is incremented by one for output of each job starting from activation of the power source. A numerical value is set in the item "job ID" when printing is executed.

The value of the item "sheet type" is a value indicating the type of a sheet. In the present embodiment, various types of sheets having different transmittances are used. When duplex printing is performed on a sheet having a high transmittance, show-through occurs in which a transferred image on the back face is transmitted through the sheet and appears in a read image on the front face. The value of the item "sheet size" is a value indicating the size of a sheet.

The value of the item "job type" is a value indicating whether the type of a printing job is a target of defect detection, a non-target of defect detection, a slip sheet for defect detection identification, or adjustment of threshold value for show-through. When the job information generation unit 213 of the printer main unit 11 generates printing job data for adjusting a threshold value for show-through, the value of the item "job type" is a value indicating adjustment of a threshold value for show-through.

Figure 9:
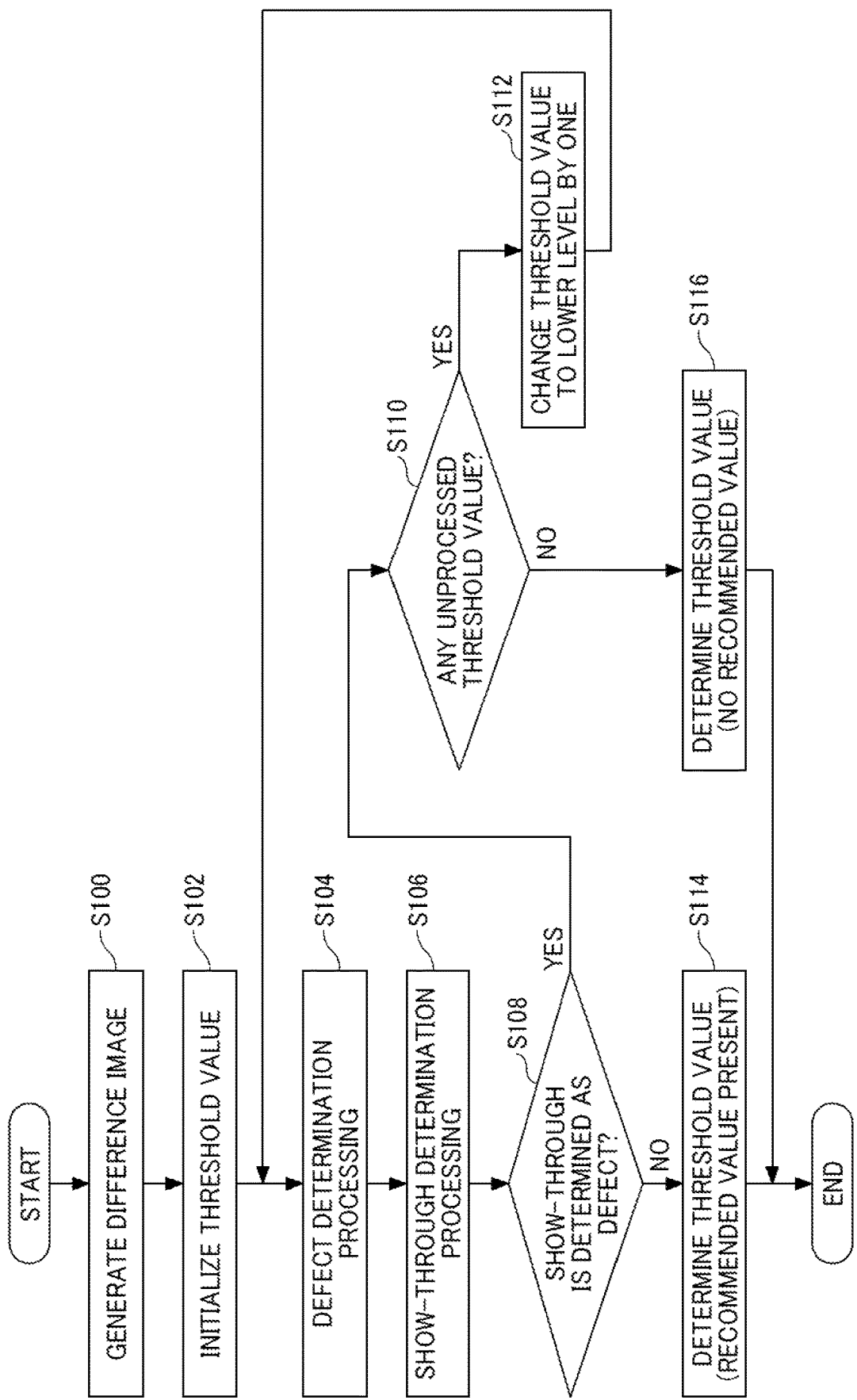
FIG. 9 is a flowchart illustrating an example of a flow of an operation of calculating a threshold value for show-through, according to an embodiment of the present disclosure.

When the value of the item "job type" is a value indicating adjustment of a threshold value for show-through, the inspection device 13 performs an operation of calculating a threshold value for show-through as illustrated in FIG. 9. FIG. 9 is a flowchart illustrating an example of a flow of the operation of calculating a threshold value for show-through.

Figure 10:
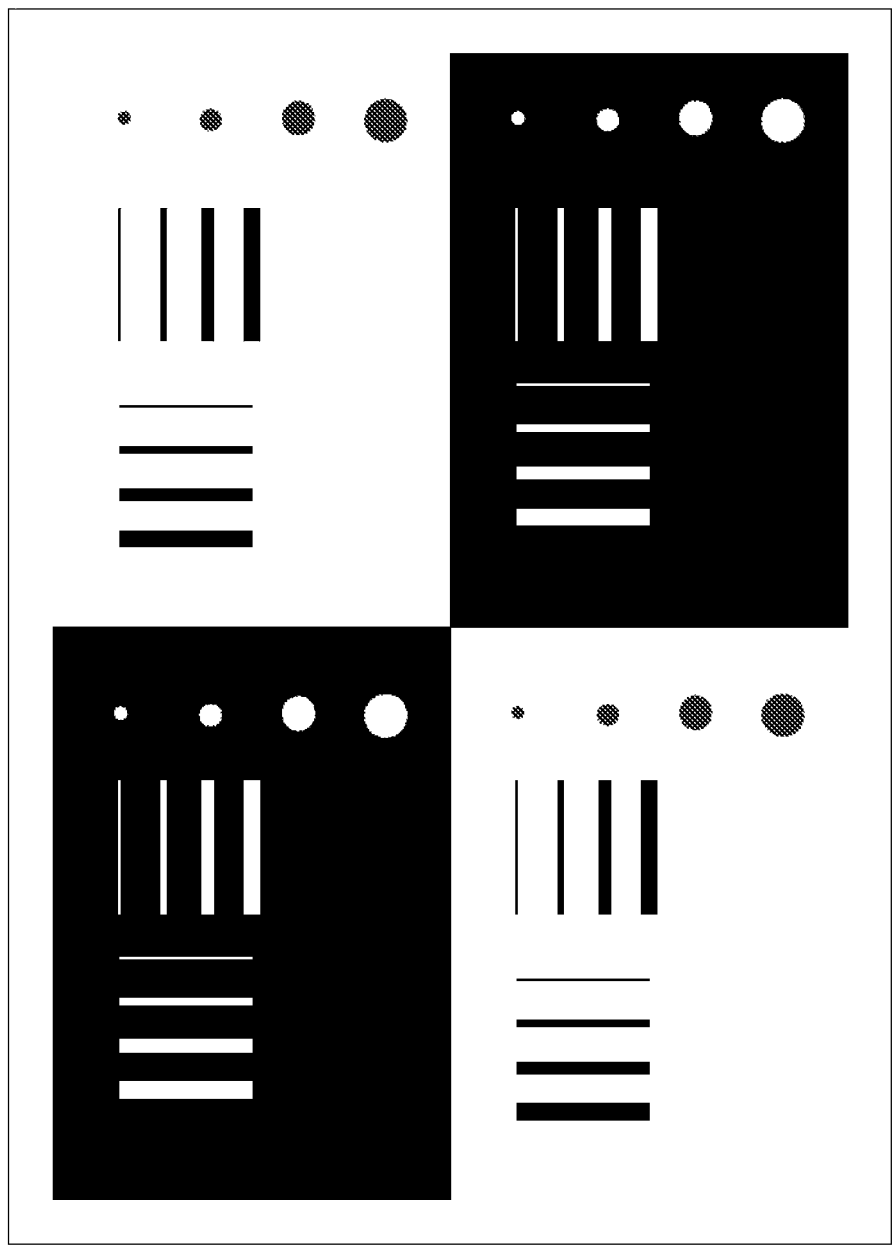
FIG. 10 is an illustration of an example of a front face of an original image, according to an embodiment of the present disclosure.
Figure 11:
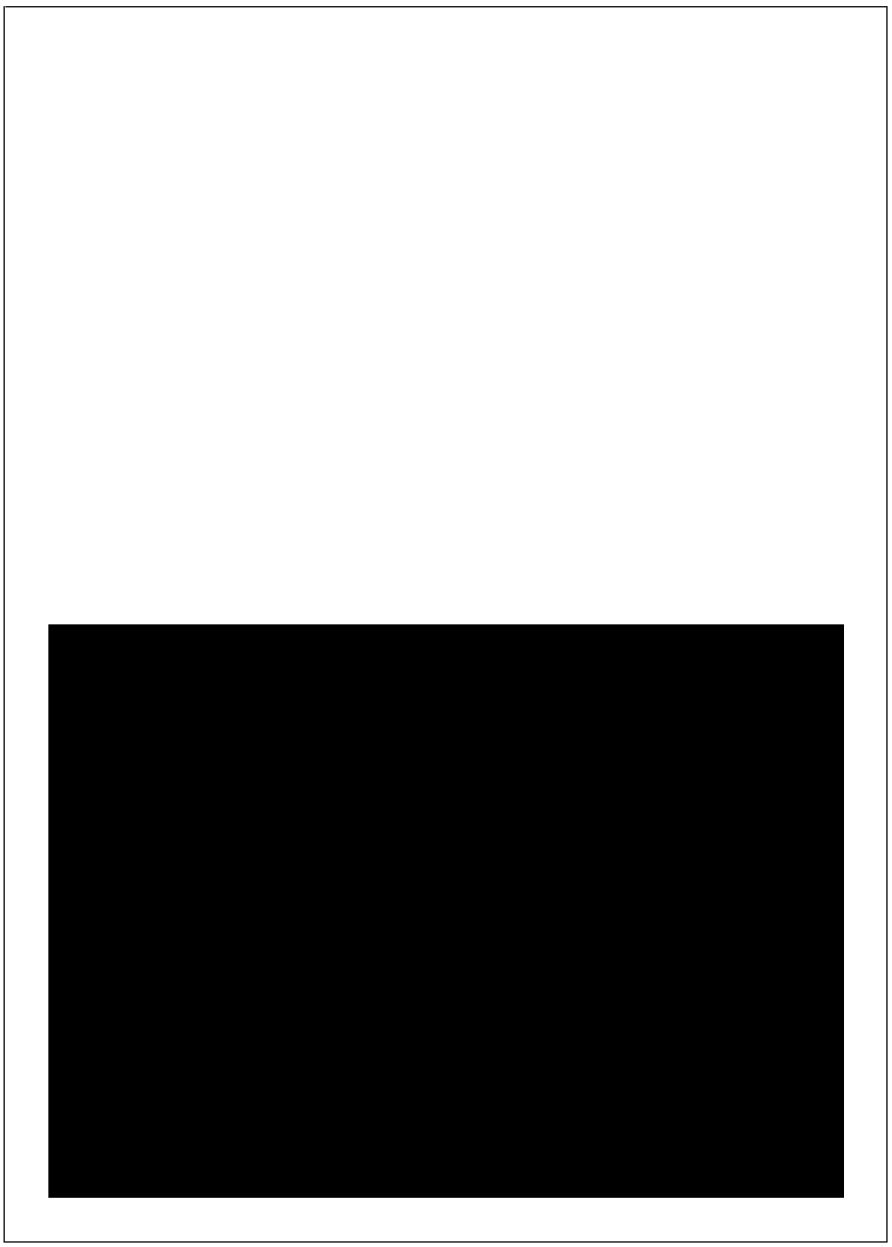
FIG. 11 is an illustration of an example of a back face of an original image, according to an embodiment of the present disclosure.

According to printing job data for adjusting a threshold value for show-through, the printer main unit 11 outputs printed matter on which a front face of an original image of a show-through determination chart as illustrated in FIG. 10 is printed on the front face of a sheet and a back face of the original image of the show-through determination chart as illustrated in FIG. 11 is printed on the back face of the sheet. FIG. 10 is an illustration of an example of the front face of the original image. FIG. 11 is an illustration of an example of the back face of the original image.

Image data of the show-through determination chart of each of FIG. 10 and FIG. 11 is stored in, for example, the storage unit 205. Lateral inversion coordinate information illustrated in FIG. 12 of the front face of the original image of the show-through determination chart of FIG. 10 and vertical inversion coordinate information illustrated in FIG. 13 of the front face of the original image of the show-through determination chart of FIG. 10 are stored in, for example, the storage unit 205.

FIG. 12 is a table illustrating an example of the lateral inversion coordinate information of the front face of the original image. FIG. 13 is a table illustrating an example of the vertical inversion coordinate information of the front face of the original image. The lateral inversion coordinate information of FIG. 12 is an example in which a range of an image object on the front face of the original image illustrated in FIG. 10 in a case where the front face of the original image is laterally inversed and superimposed is represented by coordinate data based on a circumscribed rectangle. The vertical inversion coordinate information of FIG. 13 is an example in which a range of an image object on the front face of the original image illustrated in FIG. 10 in a case where the front face of the original image is vertically inversed and superimposed is represented by coordinate data based on a circumscribed rectangle.

The printer main unit 11 ejects, to the inspection device 13, printed matter on which the front face of the original image of the show-through determination chart of FIG. 10 is printed on the front face of a sheet and the back face of the original image of the show-through determination chart of FIG. 11 is printed on the back face of the sheet.

In step S100, the inspection device 13 recognizes that the value of the item "job type" of the job information is a value indicating adjustment of a threshold value for show-through. According to print data such as an RIP image included in printing job data, the master image generation unit 308 of the inspection device 13 generates master image data of the show-through determination chart.

Figure 14:
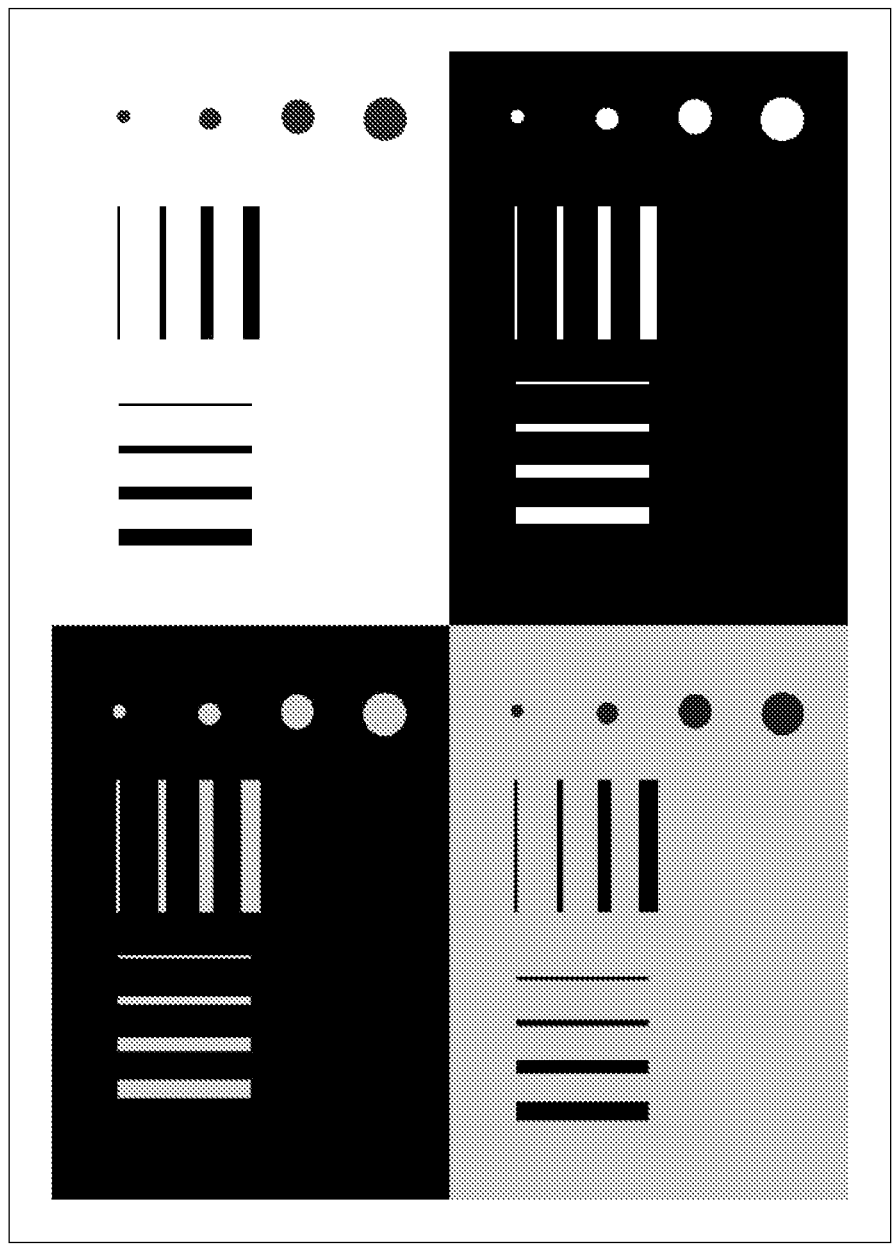
FIG. 14 is a diagram illustrating an example of a front face of a read image, according to an embodiment of the present disclosure.
Figure 15:
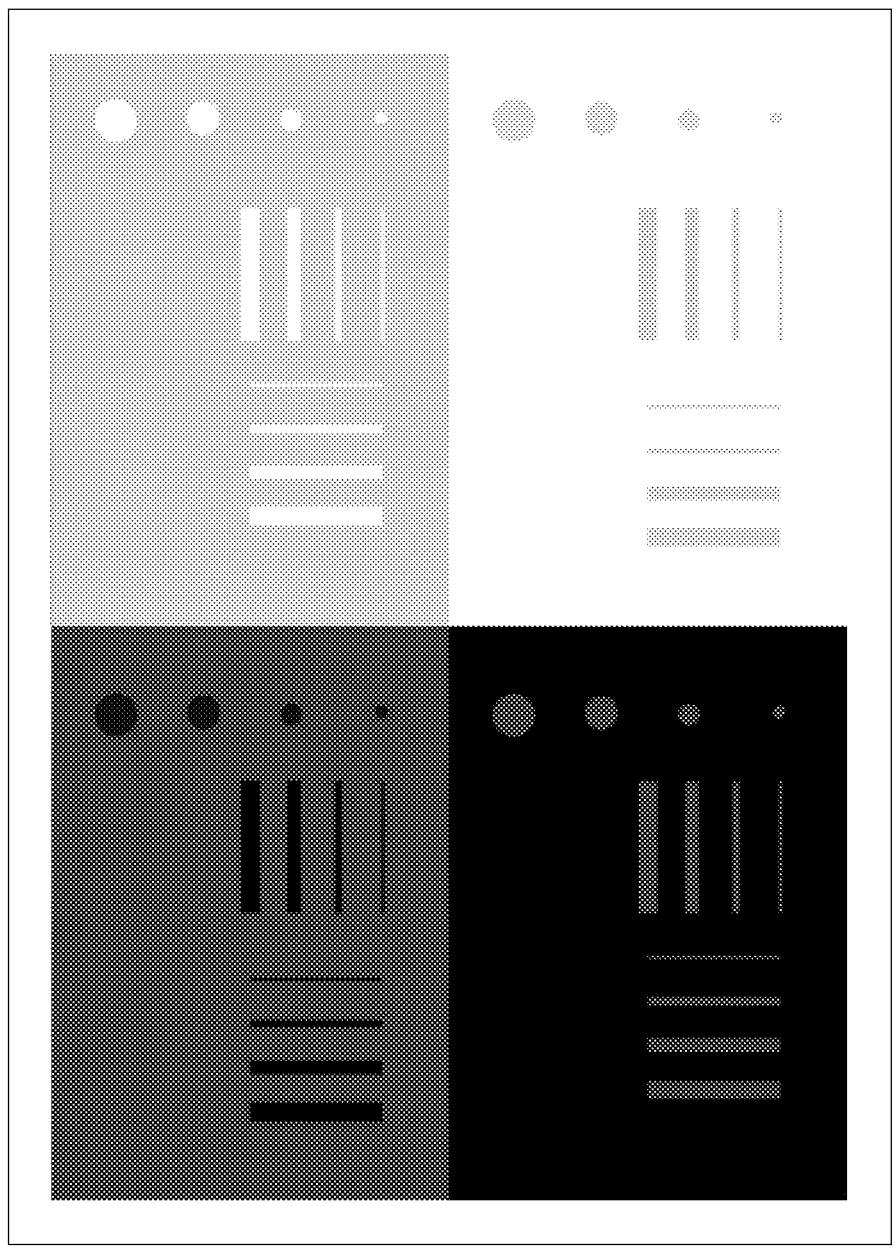
FIG. 15 is a diagram illustrating an example of a back face of a read image, according to an embodiment of the present disclosure.

The image reading unit 307 controls the first in-line sensor 131 and the second in-line sensor 132 to read read image data (inspection target image data) of FIG. 14 and FIG. 15, for example, from both faces of the printed matter output by the printer main unit 11. FIG. 14 is a diagram illustrating an example of a front face of a read image. FIG. 15 is a diagram illustrating an example of a back face of a read image.

FIG. 14 illustrates an example of the front face of the read image in which, due to the transmittance of the sheet and the density of color material used for printing, for example, a show-through occurs in which a laterally inversed transferred image on the back face of the read image illustrated in FIG. 15 is transmitted and appears on the read image front face illustrated in FIG. 14. FIG. 15 illustrates an example of the back face of the read image in which, due to the transmittance of the sheet and the density of color material used for printing, for example, a show-through occurs in which a laterally inversed transferred image on the front face of the read image illustrated in FIG. 14 is transmitted and appears on the back face of the read image as illustrated in FIG. 15. Although FIG. 14 and FIG. 15 illustrates an example of lateral inversion, the embodiments may be applicable also to vertical inversion depending on a collation direction of duplex printing.

Figure 16:
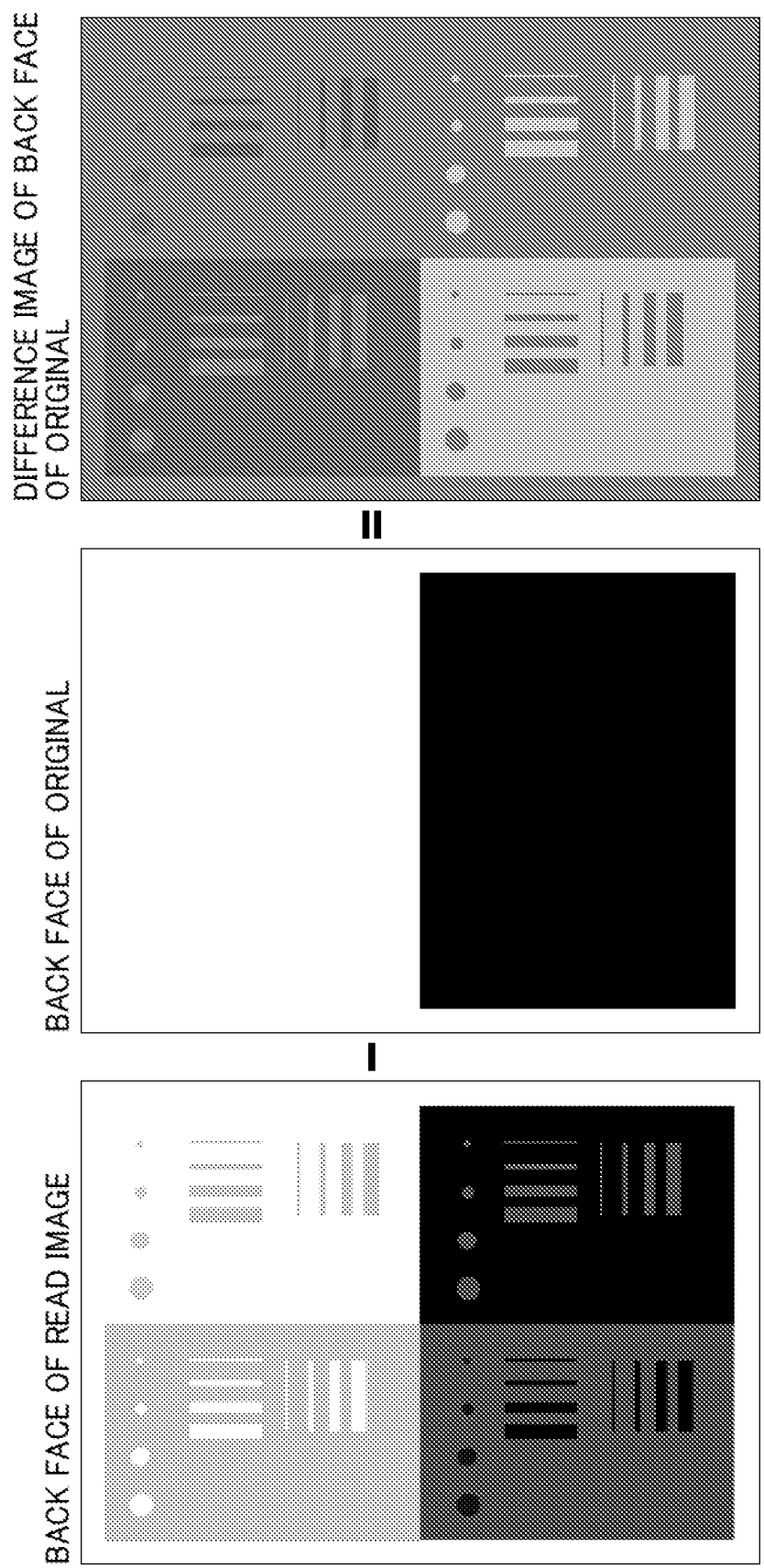
FIG. 16 is a diagram illustrating an example of difference image data of the back face of the read image, according to an embodiment of the present disclosure.

The difference image generation unit 309 generates difference image data on the basis of master image data generated by the master image generation unit 308 and the inspection target image data read from the printed matter by the image reading unit 307. For example, the difference image data on the back face of the read image is as illustrated in FIG. 16. FIG. 16 is a diagram illustrating an example of the difference image data of the back face of the read image. In the difference image data of FIG. 16, a pixel value of a pixel having no difference is 128 (50% gray), and a difference on a black side is a pixel value smaller than 128.

In the difference image data generated by the difference image generation unit 309, when a blank sheet is used as a reference, for example, a difference occurs as illustrated in FIG. 17 according to colors of pixels on the front face and the back face. FIG. 17 is a table of an example of how the difference image appears.

As indicated in FIG. 17, when a pixel on the front face is "white" and a pixel on the back face is "white," no difference occurs. When a pixel on the front face is "black" and a pixel on the back face is "black," no difference occurs. When a pixel on the front face is "white" and a pixel on the back face is "black," no difference occurs. When a pixel on the front face is "black" and a pixel on the back face is "white," a difference on the black side occurs. The difference image data generated by the difference image generation unit 309 is stored in, for example, the storage unit 305.

In step S102, the threshold value calculation processing unit 315 reads a certain threshold value from a threshold value set illustrated in FIG. 18, for example, and sets the read initial value as an initial value of the threshold value. FIG. 18 is a table of an example of the threshold value set. The threshold value set of FIG. 18 is an example of a threshold value set of a dot defect, a vertical linear defect, and a horizontal linear defect. FIG. 18 indicates an example in which a threshold value set includes three threshold values for a dot defect, a vertical linear defect, and a horizontal linear defect, and each threshold value set has threshold values of five stages. The five levels are just one example. In another example, the number of levels is smaller than five, such as three levels. In this case, the determination speed gets faster. In still another example, the number of levels is larger than five, such as ten levels. This makes it easy for a user to select a threshold value that matches the user's needs. The "level" of the threshold value set in FIG. 18 is a value abstractly indicating the strength of the determination level of defects in a printed matter. The threshold value in FIG. 18 is a value indicating an allowable value of the difference between the pixel values when the difference image data is generated on the basis of the master image data generated by the master image generation unit 308 and the inspection target image data read from the printed matter by the image reading unit 307. The value indicates an allowable range of the difference (absolute value) with respect to the pixel value "128" of a pixel having no difference.

For example, the threshold set in FIG. 18 is an example in which the determination level of "level 1" is low and the criterion is loose. Further, the threshold set in FIG. 18 is an example in which the determination level of "level 5" is high and the criterion is strict. The threshold value set of FIG. 18 is merely one example. In another example, it suffices that at least one threshold value set of the dot defect, the vertical linear defect, and the horizontal linear defect is provided. Furthermore, the threshold value set of at least one of the dot defect, the vertical linear defect, and the horizontal linear defect in FIG. 18 may be divided into two or more. For example, the threshold value set for the dot may be divided into a threshold value set for a dot defect which is small and dark and has a sharp edge and a threshold value set for a dot defect which is large and light and has a blurred edge.

In step S102 of FIG. 9, the threshold value calculation processing unit 315 reads the threshold value of "level 5" having the highest determination level from the threshold value set of FIG. 18, for example, and sets the read threshold value as the initial value of the threshold value.

In step S104, the defect determination processing unit 313 determines whether a defect is present in the printed matter by performing defect determination processing using the set threshold value on the difference image data generated in step S100.

For example, the defect determination processing unit 313 performs a convolution operation on each pixel of the difference image data by filter processing using defect determination filters as illustrated in FIG. 19 to FIG. 21 and compares the result of the convolutional operation with the threshold value to perform defect determination processing. FIG. 19 is a diagram illustrating of an example of a dot defect determination filter. FIG. 20 is a diagram illustrating an example of a vertical linear defect determination filter. FIG. 21 is a diagram illustrating an example of a horizontal linear defect determination filter.

The threshold values of the defect determination filters illustrated in FIG. 19 to FIG. 21 are adjusted so that the sum of positive values and the sum of negative values are 1 and −1, respectively. A result of the convolution operation by the defect determination filter of FIG. 19 is a difference between a target pixel and the average value of the adjacent eight pixels. A result of the convolution operation by the defect determination filter of FIG. 20 is a difference between an average value of five pixels in a vertical direction with a target pixel as a center and an average value of ten pixels adjacent to the five pixels on the left and right sides thereof. A result of the convolution operation by the defect determination filter of FIG. 21 is a difference between an average value of five pixels in a lateral direction with a target pixel as a center and an average value of ten pixels adjacent to the five pixels above and below thereof.

Thus, the result of the convolution operation using the defect determination filters of FIG. 19 to FIG. 21 is approximately a difference value of the pixel compared with the surrounding pixel values. When an absolute value of the result of the convolution operation exceeds the threshold value, the defect determination processing unit 313 determines that the target pixel is a defective pixel.

In step S106, the threshold value calculation processing unit 315 performs show-through determination processing using a pixel that is determined as the defective pixel in step S104. The show-through determination processing is processing of determining whether a show-through is determined as a defect in a printed matter. When the threshold value calculation processing unit 315 determines the show-through as the defect of the printed matter, the threshold value calculation processing unit determines "show-through determination: yes."

For example, the threshold value calculation processing unit 315 determines whether coordinates of the defective pixel determined in step S104 are included in the range indicated by the upper left coordinates and the lower right coordinates of the lateral inversion coordinate information of FIG. 12 or the vertical inversion coordinate information of FIG. 13.

When at least one of coordinates of the defective pixel determined in step S104 is included in the range indicated by the upper left coordinates and the lower right coordinates of the lateral inversion coordinate information of FIG. 12 or the vertical inversion coordinate information of FIG. 13, the threshold value calculation processing unit 315 determines "show-through determination: yes." If none of the coordinates of the defective pixel determined in step S104 is included in the range indicated by the upper left coordinates and the lower right coordinates of the lateral inversion coordinate information of FIG. 12 or the vertical inversion coordinate information of FIG. 13, the threshold value calculation processing unit 315 determines "show-through determination: No."

In step S108, when the result of the show-through determination processing in step S106 is not "show-through determination: yes," the threshold value calculation processing unit 315 performs a process of step S114. In step S114, the threshold value calculation processing unit 315 determines the set threshold value as a recommended value. The recommended value of the threshold value determined in step S114 is a threshold value for show-through, at which show-through in a printed matter is not determined as a defect of the printed matter.

The flowchart of FIG. 9 is an example in which a threshold value with the highest determination level and a strict criterion is set as an initial value and the determination level is gradually lowered. Accordingly, the recommended value of the threshold value determined in step S114 is a threshold value having the highest determination level among the threshold values for show-through at which show-through in a printed matter is not determined as the defect of the printed matter.

When the result of the show-through determination processing in step S106 is "show-through determination: yes" in step S108, the threshold value calculation processing unit 315 performs a process of step S110. In step S110, the threshold value calculation processing unit 315 determines whether the threshold value set illustrated in FIG. 18, for example, includes a threshold value of an unprocessed determination level.

When the threshold value set illustrated in FIG. 18, for example, includes a threshold value of an unprocessed determination level, the threshold value calculation processing unit 315 performs setting to change the determination level to a threshold value lowered by one in step S112. Then, the operation returns to the process of step S104.

When the threshold value set illustrated in FIG. 18, for example, includes no threshold value of an unprocessed determination level, the threshold value calculation processing unit 315 performs a process of step S116. The process of step S116 is performed when the threshold value set of FIG. 18 includes no threshold value for show-through, at which show-through in a printed matter is not determined as a defect of the printed matter. In step S116, the threshold value calculation processing unit 315 determines that no recommended value is present, since no threshold value for show-through, at which show-through in a printed material is determined as a defect of the printed matter.

In the operation of the flowchart of FIG. 9, the threshold value having the highest determination level and the strictest criterion is set as the initial value, and the determination level is gradually lowered. Accordingly, a threshold value having the highest determination level among the threshold values for show-through, at which show-through in the printed matter is not determined as a defect of the printed matter, can be set as the recommended value.

Figure 22:
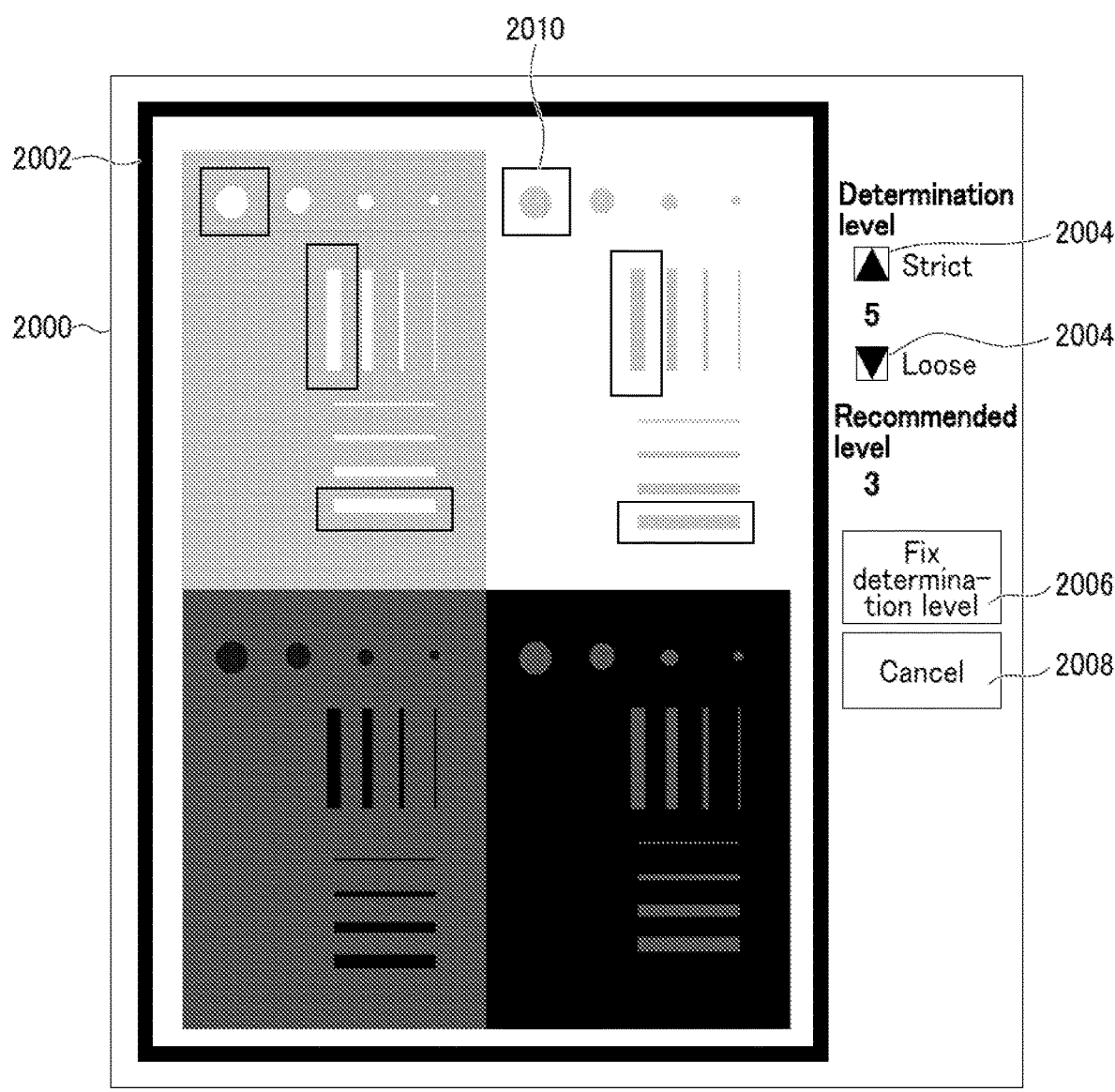
FIG. 22 is a diagram illustrating an example of a result check user interface (UI) that allows a user to check a result of adjustment of a threshold value for show-through, according to an embodiment of the present disclosure.
Figure 23:
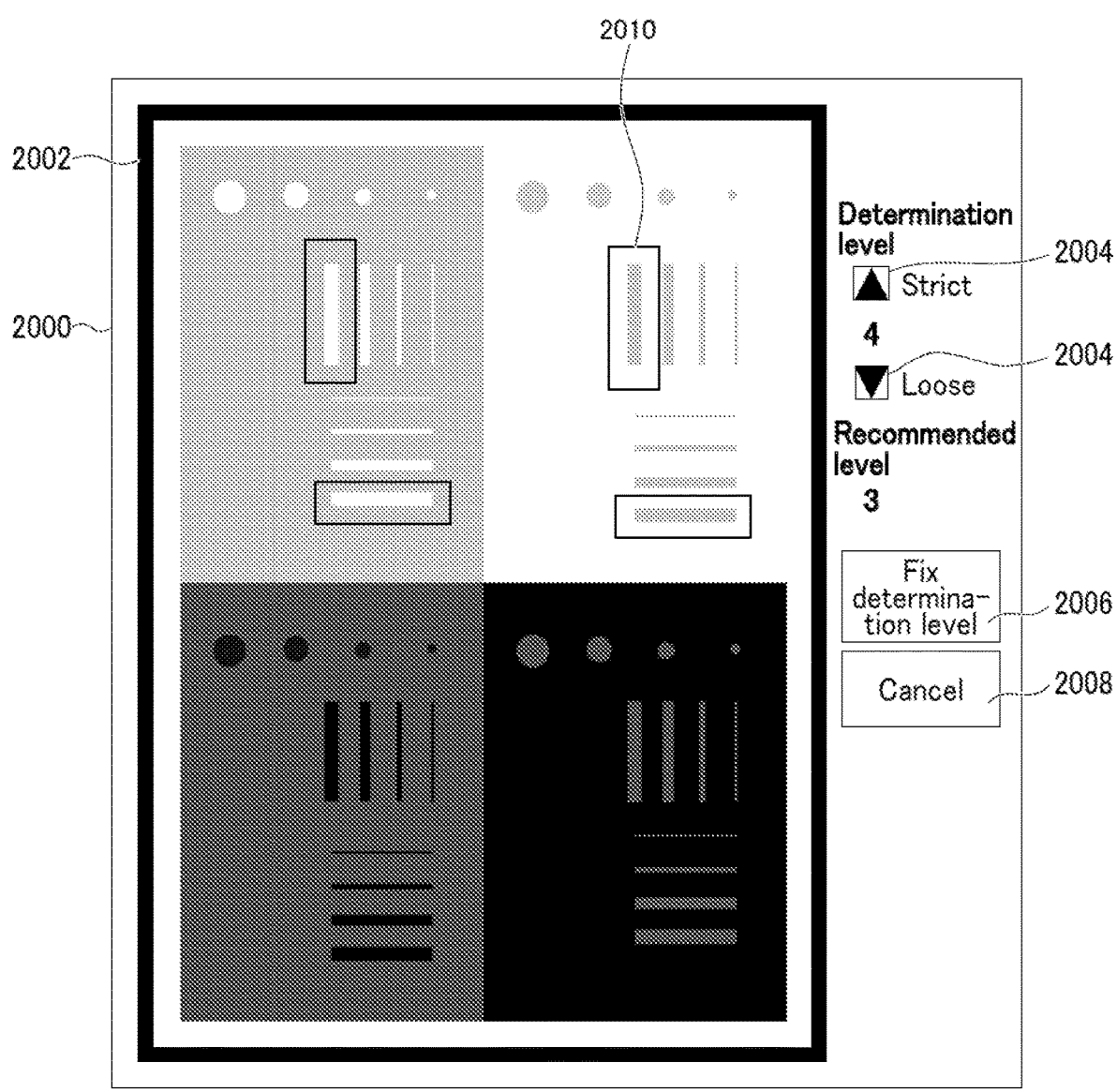
FIG. 23 is a diagram illustrating an example of a result check user UI that allows a user to check a result of adjustment of a threshold value for show-through, according to an embodiment of the present disclosure.
Figure 24:
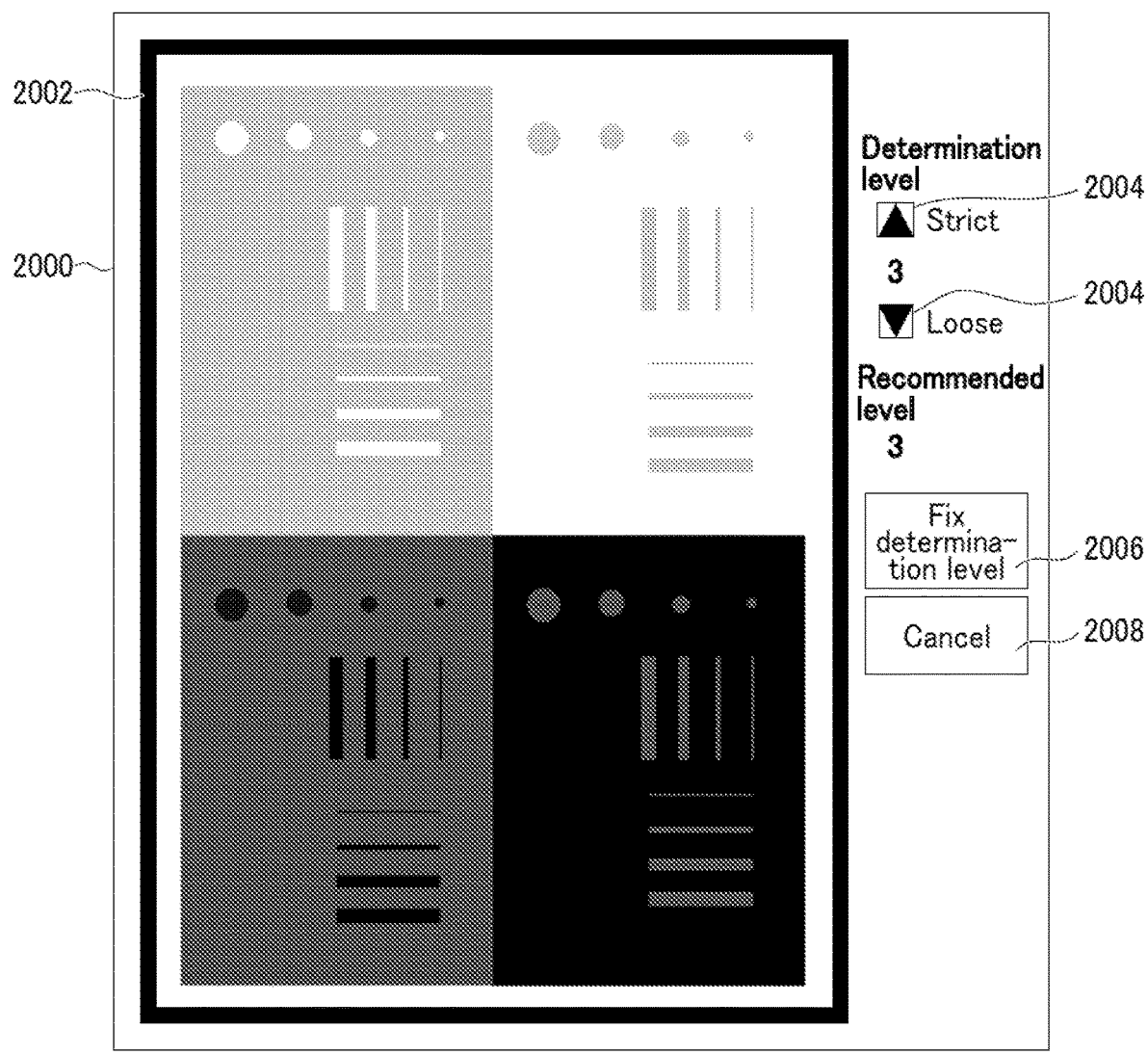
FIG. 24 is a diagram illustrating an example of a result check user UI that allows a user to check a result of adjustment of a threshold value for show-through, according to an embodiment of the present disclosure.

Further, the result of the adjustment of the threshold value for show-through by the operation of the flowchart of FIG. 9 is presented to a user by being displayed in a result check user interface (UI) 2000 that allows a user to check a result of adjustment of a threshold value for show-through as illustrated in FIG. 22 to FIG. 24, for example. FIG. 22 to FIG. 24 are diagrams each illustrating an example of the result check UI 2000 that allows a user to check a result of adjustment of a threshold value for show-through.

The result check UI 2000 in FIG. 22 to FIG. 24 illustrates an example in which the display control unit 302 transmits screen information in response to a request received from the control panel 133 or from a display unit such as a web browser of another device to control the display unit to display the screen information. The display control unit 302 may display the display screen information on the display unit by bidirectional communication or push transmission.

In the result check UI 2000, an inspection target image 2002 read from both faces of a printed matter output by the printer main unit 11 is displayed. In the result check UI 2000, inspection threshold value change buttons 2004, a determination level fix button 2006, and a cancel button 2008 are displayed. In the result check UI 2000, a recommendation level indicating the recommended value of a threshold value for show-through is displayed.

Further, on the inspection target image 2002 in the result check UI 2000, a defect determination display frame 2010 that surrounds an image object for which determination is made indicating "show-through determination: yes" is present among image objects on an original image. The display of the defect determination display frame 2010 makes it easier for a user to visually recognize an image object for which determination is made indicating that the show-through determination is present among multiple image objects on the inspection target image 2002.

Further, in the result check UI 2000, a threshold value that is changeable according to an operation on the inspection threshold value change buttons 2004 is displayed between the inspection threshold value change buttons 2004. The defect determination display frame 2010 displayed on the inspection target image 2002 in the result check UI 2000 represents a result of the show-through determination processing using the threshold value displayed between the inspection threshold value change buttons 2004.

For example, the result check UI 2000 in FIG. 22 is an example in which the recommendation level is "3," and a user operates the inspection threshold value change buttons 2004 to change the threshold value between the inspection threshold value change buttons 2004 to "5" corresponding to a stricter criterion. Accordingly, in the result check UI 2000 of FIG. 22, a plurality of defect determination display frames 2010 are displayed in a manner that the frames surround a plurality of image objects on the inspection target image 2002.

Further, the result check UI 2000 in FIG. 23 is an example in which the recommendation level is "3," and a user operates the inspection threshold value change buttons 2004 to change the threshold value between the inspection threshold value change buttons 2004 to "4." Accordingly, in the result check UI 2000 of FIG. 23, the number of defect determination display frames 2010 displayed in a manner that the frames surround the plurality of image objects on the inspection target image 2002 is smaller than the number of defect determination display frames 2010 in the result check UI 2000 of FIG. 22.

Further, the result check UI 2000 in FIG. 24 is an example in which a user operates the inspection threshold value change buttons 2004 to change the threshold value between the inspection threshold value change buttons 2004 to "3," which is the same value as the recommendation level "3." Accordingly, in the result check UI 2000 of FIG. 24, no defect determination display frame 2010 is displayed on the inspection target image 2002.

The user checks the result check UI 2000 of FIG. 22 to FIG. 24 and performs an operation of pressing the determination level fix button 2006, to update a threshold value for show-through used for the defect determination processing of a printed matter. After the update of the threshold value for show-through, the display control unit 302 may return to a screen for executing printing of the show-through determination chart.

When a user wants to redo the operation of the flowchart in FIG. 9 for a reason such as the occurrence of a defect other than the show-through, the user presses the cancel button 2008 to return to a screen for executing printing of the show-through determination chart.

With the image forming system 1 according to the present embodiment, the printer main unit 11 prints a printed matter, and the processing of the flowchart of FIG. 9 is performed on the printed matter, thereby determination is performed as to whether a show-through of the printed matter is determined as a defect of the printed matter for each of the plurality of threshold values with respect to one difference image. Thus, the image forming system 1 according to of the present embodiment can provide a user with the strictest threshold value, as the threshold value for show-through, within a range in which the show-through is not identified as a defect of the printed matter.

Other Embodiment

Since another embodiment is the same as Embodiment 1 in a part, in the following description, differences from Embodiment are focused, and the redundant descriptions of Embodiment 1 are omitted or simplified appropriately.

As described with reference to the flowchart of FIG. 9, Embodiment 1 relates to an example in which a threshold value with the highest determination level and a strict criterion is set as an initial value and the determination level is gradually lowered. In alternative to the operation described with reference to the flowchart of FIG. 9, for example, a threshold value having the lowest determination level and a loose criterion may be set as an initial value, and the determination level may be gradually increased.

In a case where the threshold value having the lowest determination level and the loose criterion is set as the initial value, when the result of the show-through determination processing is "show-through determination: yes," no recommendation value is provided for the threshold value for show-through. When the result of the show-through determination processing is "show-through determination: No," the threshold value is changed to stricter threshold value by one. The determination level is gradually increased until the result of the show-through determination processing is "show-through determination: yes." A threshold value that is looser by one than the threshold value at which the result of the show-through determination processing is "show-through determination: yes" is set as a recommended value of a threshold value for show-through. When there is no more no processed threshold value in the threshold value set until the result of the show-through determination processing gets "show-through determination: yes," the threshold value being set that has the highest determination level and the strict criterion is set as a recommended value of a threshold value for show-through.

The result check UI 2000 in each of FIG. 22 to FIG. 24 is merely one example. In another example, the inspection threshold value change buttons 2004 and the defect determination display frame 2010 may be omitted. The operation of pressing the determination level fix button 2006 for updating a threshold value for show-through used in the defect determination processing of a printed matter may be omitted. In this case, the display of the result check UI 2000 may be omitted.

In the above-described embodiments, the DFE 50, the inspection device 13 and the printer main unit 11 may be configured to share the above-described processing steps in various combinations. The components of the DFE 50, the inspection device 13, and the printer main unit 11 may be combined into a single apparatus or may be divided into a plurality of apparatuses.

In an embodiment, the DFE 50 or the inspection device 13 may be configured as an information processing system including a plurality of computing devices such as a server cluster. The plurality of computing devices may be configured to communicate with one another through any type of communication link including a network and a shared memory and performs the processes disclosed herein.

For example, various sheets having different transmittances are used as recording media. When duplex printing is performed on a thin sheet having a high transmittance, so-called show-through occurs in which a transferred image on the back face is transmitted through and appears in a read image on the front face. In some cases, such the show-through is determined as a defect. In view of such a situation, a threshold value used for determining the presence or absence of a defect has to be adjusted to a threshold value (show-through addressed threshold value) that deals with the show-through so that the show-through in a printed matter is not determined as a defect of the printed matter.

A system according to the related art acquires a transmittance indicating a rate at which an image formed on one face of a recording medium is shown through to the other face, and corrects an image for front face inspection with a correction value generated based on pixels of an image for back face inspection and the acquired transmittance. In other words, the disclosed system does not adjust a threshold value used for inspection.

According to one or more embodiments of the present disclosure, an image forming system is provided that calculates a threshold value with which show-through in a printed matter is not determined as a defect of the printed matter among multiple threshold values used for determining the presence or absence of a defect of a printed matter.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

According to one or more embodiments, an image forming apparatus prints a printed matter and inspects the printed matter. The image forming apparatus incudes circuitry to: read an inspection target image from the printed matter; generate a difference image between the inspection target image and a comparison target image; perform processing on the difference image using a threshold value to perform determination as to whether a defect of the printed matter is present; and calculate a threshold value for show-through at which show-through of the printed matter is not determined as the defect of the printed matter among multiple threshold values based on a result of the determination.

According to one or more embodiments, a non-transitory computer-executable medium stores a plurality of instructions, which, when executed by one or more processors, cause the one or more processors to perform a method. The method includes: reading an inspection target image from the printed matter; generating a difference image between the inspection target image and a comparison target image; performing processing on the difference image using a threshold value to perform determination as to whether a defect of the printed matter is present; and calculating a threshold value for show-through at which show-through of the printed matter is not determined as the defect of the printed matter among multiple threshold values based on a result of the determination.

Aspects of the present disclosure are, for example, as follows.

Aspect 1

According to Aspect 1, an image forming system includes an image reading means for reading an inspection target image from a printed matter.

The image forming system includes a difference image generation means for generating a difference image between the inspection target image and a comparison target image.

The image forming system includes incudes a defect determination processing means for performing processing on the difference image using a threshold value to perform determination as to whether a defect of the printed matter is present.

The image forming system includes a threshold value calculation processing means for calculating a threshold value for show-through at which show-through of the printed matter is not determined as the defect of the printed matter among multiple threshold values based on a result of the determination.

Aspect 2

According to Aspect 2, the image forming system of the Aspect 1 further includes a storing means for, based on an image to be printed on a front face of the printed matter and an image to be printed on a back face of the printed matter in order to determine show-through, storing lateral inversion coordinate information and vertical inversion coordinate information. The lateral inversion coordinate information indicates a range of an image object on the printed matter when the image is laterally inverted and superimposed. The vertical inversion coordinate information indicates a range of an image object on the printed matter when the image is vertically inverted and superimposed.

The threshold value calculation processing means calculates the threshold value for show-through by using a coordinate included in the range of the image object indicated by the lateral inversion coordinate information among coordinates determined as the defect of the printed matter in a case of duplex printing in which the image is laterally inversed and superimposed. The threshold value calculation processing means calculates the threshold value for show-through by using a coordinate included in the range of the image object indicated by the vertical inversion coordinate information among the coordinates determined as the defect of the printed matter in a case of duplex printing in which the image is vertically inversed and superimposed.

Aspect 3

According to Aspect 3, in the image forming system of the Aspect 1 or the Aspect 2, the threshold value calculation processing means calculates, as a recommended value of the threshold value for show-through, one threshold value that is closest to the threshold value according to which the show-through of the printed matter is determined as the defect of the printed matter and according to which the show-through of the printed matter is not determined as the defect of the printed matter.

Aspect 4

According Aspect 4, the image forming system of any one of the Aspect 1 to Aspect 3 further includes a display control means for controlling a screen that displays the calculated threshold value and receives, from a user, an operation of determining the threshold value for show-through as the threshold value used by the defect determination processing means.

Aspect 5

According to Aspect 5, in the image forming system of the Aspect 4, when the threshold value is changed by the operation by the user, the display control means visually changes the image object determined as the defect of show-through on the inspection target image in a case of the changed threshold value and displays visually changed image object, based on coordinates determined as the defect of show-through of the printed matter stored in association with multiple threshold values.

Aspect 6

According to Aspect 6, in the image forming system according to any one of the Aspect 1 to the Aspect 5, the defect determination processing means determines whether the defect of show-through is present in the printed matter for each of the multiple threshold values with respect to the one difference image.

Aspect 7

According to Aspect 7, an inspection device that inspects a printed matter includes
an image reading means for reading an inspection target image from the printed matter.

The inspection device includes a difference image generation means for generating a difference image between the inspection target image and a comparison target image.

The inspection device includes incudes a defect determination processing means for performing processing on the difference image using a threshold value to perform determination as to whether a defect of the printed matter is present.

The inspection device includes a show-through threshold value calculation processing means for calculating a threshold value for show-through at which show-through of the printed matter is not determined as the defect of the printed matter among the multiple threshold values based on a result of the determination.

Aspect 8

According to Aspect 8, an image forming apparatus that prints a printed matter and inspects the printed matter includes an image reading means for reading an inspection target image from the printed matter.

The image forming apparatus includes a difference image generation means for generating a difference image between the inspection target image and a comparison target image.

The image forming apparatus includes incudes a defect determination processing means for performing processing on the difference image using a threshold value to perform determination as to whether a defect of the printed matter is present.

The image forming apparatus includes a threshold value calculation processing means for calculating a threshold value for show-through at which show-through of the printed matter is not determined as the defect of the printed matter among multiple threshold values based on a result of the determination.

Aspect 9

According to Aspect 9, an inspection method is performed by an inspection device that inspects a printed matter. The inspection method includes reading an inspection target image from the printed matter.

The inspection method includes generating a difference image between the inspection target image and a comparison target image.

The inspection method includes performing processing on the difference image using a threshold value to perform determination as to whether a defect of the printed matter is present.

The inspection method includes calculating a threshold value for show-through at which show-through of the printed matter is not determined as the defect of the printed matter among multiple threshold values based on a result of the determination.

Aspect 10

According to Aspect 10, a program causes a computer that inspects a printed matter to read an inspection target image from the printed matter.

The program causes the computer to generate a difference image between the inspection target image and a comparison target image.

The program causes the computer to perform processing on the difference image using a threshold value to perform determination as to whether a defect of the printed matter is present.

The program causes the computer to calculate a threshold value for show-through at which show-through of the printed matter is not determined as the defect of the printed matter among multiple threshold values based on a result of the determination.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming system, comprising circuitry configured to:
    read an inspection target image from a printed matter;
    generate a difference image between the inspection target image and a comparison target image;
    perform processing on the difference image using a threshold value to perform determination as to whether a defect of the printed matter is present;
    calculate a threshold value for show-through at which a show-through of the printed matter is not determined as the defect of the printed matter among multiple threshold values based on a result of the determination;
    store lateral inversion coordinate information and vertical inversion coordinate information, based on an image to be printed on a front face of the printed matter and another image to be printed on a back face of the printed matter in order to determine the show-through, the lateral inversion coordinate information indicating a range of an image object on the printed matter when the image is laterally inverted and superimposed, the vertical inversion coordinate information indicating a range of an image object on the printed matter when the image is vertically inverted and superimposed; and
    calculate the threshold value for show-through by using a coordinate included in the range of the image object indicated by the lateral inversion coordinate information among coordinates determined as the defect of the printed matter in a case of duplex printing in which the image is laterally inversed and superimposed, and calculate the threshold value for show-through by using a coordinate included in the range of the image object indicated by the vertical inversion coordinate information among coordinates determined as the defect of the printed matter in a case of diplex printing in which the image is vertically inversed and superimposed.

2. The image forming system of claim 1, wherein
    the circuitry is further configured to calculate, as a recommended value of the threshold value for show-through, one threshold value that is closest to the threshold value according to which the show-through of the printed matter is determined as the defect of the printed matter and according to which the show-through of the printed matter is not determined as the defect of the printed matter.

3. The image forming system of claim 1, wherein the circuitry is further configured to control a screen that displays the calculated threshold value and receive, from a user, an operation of determining the threshold value for show-through as the threshold value used for performing the determination as to whether the defect of the printed matter is present.

4. The image forming system of claim 3, wherein when the threshold value is changed by the operation by the user, the circuitry is further configured to visually change an image object determined as the defect of show-through on the inspection target image in a case of the changed threshold value and display the visually changed image object, based on coordinates determined as the defect of show-through of the printed matter stored respectively in association with multiple threshold values including the threshold value.

5. The image forming system of claim 1, wherein the circuitry is further configured to determine whether the defect of show-through of the printed matter is present for each of the multiple threshold values with respect to the difference image, which is one difference image.

6. An inspection device, comprising circuitry configured to:
read an inspection target image from a printed matter:
generate a difference image between the inspection target image and a comparison target image;
perform processing on the difference image using a threshold value to perform determination as to whether a defect of the printed matter is present;
calculate a threshold value for show-through at which show-through of the printed matter is not determined as the defect of the printed matter among multiple threshold values based on a result of the determination;
store lateral inversion coordinate information and vertical inversion coordinate information, based on an image to be printed on a front face of the printed matter and another image to be printed on a back face of the printed matter in order to determine the show-through, the lateral inversion coordinate information indicating a range of an image object on the printed matter when the image is laterally inverted and superimposed, the vertical inversion coordinate information indicating a range of an image object on the printed matter when the image is vertically inverted and superimposed; and
calculate the threshold value for show-through by using a coordinate included in the range of the image object indicated by the lateral inversion coordinate information among coordinates determined as the defect of the printed matter in a case of duplex printing in which the image is laterally inverted and superimposed, and calculate the threshold value for show-through by using a coordinate included in the range of the image object indicated by the vertical inversion coordinate information among coordinates determined as the defect of the printed matter in a case of duplex printing in which the image is vertically inversed and superimposed.

7. An inspection method performed by an inspection device that inspects a printed matter, the inspection method comprising:
reading an inspection target image from the printed matter;
generating a difference image between the inspection target image and a comparison target image;
performing processing on the difference image using a threshold value to perform determination as to whether a defect of the printed matter is present;
calculating a threshold value for show-through at which show-through of the printed matter is not determined as the defect of the printed matter among multiple threshold values based on a result of the determination;
storing lateral inversion coordinate information and vertical inversion coordinate information, based on an image to be printed on a front face of the printed matter and another image to be printed on a back face of the printed matter in order to determine the show-through, the lateral inversion coordinate information indicating a range of an image object on the printed matter when the image is laterally inverted and superimposed, the vertical inversion coordinate information indicating a range of an image object on the printed matter when the image is vertically inverted and superimposed; and
calculating the threshold value for show-through by using a coordinate included in the range of the image object indicated by the lateral inversion coordinate information among coordinates determined as the defect of the printed matter in a case of duplex printing, in which the image is laterally inversed and superimposed, and calculating the threshold value for show-through by using a coordinate included in the range of the image object indicated by the vertical inversion coordinate information among coordinates determined as the defect of the printed matter in a case of duplex printing in which the image is vertically inversed and superimposed.

* * * * *